US012312847B2

(12) United States Patent
Alonzi

(10) Patent No.: US 12,312,847 B2
(45) Date of Patent: May 27, 2025

(54) DOOR HINGE WITH INTEGRATED DOOR CHECK

(71) Applicant: Steven Alonzi, Toronto (CA)

(72) Inventor: Steven Alonzi, Toronto (CA)

( * ) Notice: Subject to any disclaimer, the term of this patent is extended or adjusted under 35 U.S.C. 154(b) by 534 days.

(21) Appl. No.: 17/078,167

(22) Filed: Oct. 23, 2020

(65) Prior Publication Data

US 2021/0164277 A1 Jun. 3, 2021

Related U.S. Application Data

(60) Provisional application No. 62/942,879, filed on Dec. 3, 2019.

(51) Int. Cl.
*E05D 11/10* (2006.01)

(52) U.S. Cl.
CPC .. *E05D 11/1057* (2013.01); *E05D 2011/1035* (2013.01); *E05Y 2201/628* (2013.01); *E05Y 2600/622* (2013.01); *E05Y 2600/626* (2013.01); *E05Y 2900/531* (2013.01)

(58) Field of Classification Search
CPC ............. E05D 11/1042; E05D 11/1057; E05D 11/1085; E05D 11/082; E05D 11/084; E05D 11/087; E05D 7/121; F16B 43/009; Y10T 403/7064
USPC ........................................ 16/386; 296/146.11
See application file for complete search history.

(56) References Cited

U.S. PATENT DOCUMENTS

| | | | | | |
|---|---|---|---|---|---|
| 784,104 | A * | 3/1905 | Caley | E05D 11/087 16/342 |
| 1,028,953 | A * | 6/1912 | Onyons | E05D 11/1042 16/334 |
| 2,039,960 | A | 5/1936 | Jacobs | |
| 2,362,923 | A * | 11/1944 | Pardoe | E05D 11/1085 16/304 |
| 2,553,185 | A * | 5/1951 | Gessler | E05D 11/1085 16/341 |
| 2,890,477 | A * | 6/1959 | Miller | E05D 11/1085 16/322 |
| 3,065,497 | A | 11/1962 | Faber | |
| 3,191,216 | A * | 6/1965 | Hufton | E05F 5/00 16/333 |

(Continued)

FOREIGN PATENT DOCUMENTS

| | | | |
|---|---|---|---|
| AU | 2009352469 | B2 | 9/2013 |
| CA | 2277114 | A1 | 1/2001 |

(Continued)

OTHER PUBLICATIONS

Rahul H. Aghav, Prof. R.S. Tajane , "Integrated Check Strap for Car Door," International Journal of Scientific & Engineering Research, vol. 4, Issue 11, Nov. 2013, ISSN 2229-5518, pp. 1621-1625.

*Primary Examiner* — Emily M Morgan

(57) ABSTRACT

A vehicle door hinge with integrated door check. The vehicle door hinge includes a vehicle body bracket securable to a vehicle body, a vehicle door bracket securable to a vehicle door, a hinge pin providing a rotational connection between the vehicle body bracket and the vehicle door bracket, a door check plate having a bearing engagement surface, and a resiliently compressible bias positioned to axially bias the bearing engagement surface against bearings of the hinge pin.

20 Claims, 28 Drawing Sheets

(56) References Cited

U.S. PATENT DOCUMENTS

| | | | | |
|---|---|---|---|---|
| 3,628,845 | A * | 12/1971 | Grimm | E05F 1/063 16/312 |
| 3,722,027 | A | 3/1973 | Ventre | |
| 3,722,031 | A * | 3/1973 | Bourgeois | E05F 1/063 16/317 |
| 3,905,064 | A | 9/1975 | Brockhaus | |
| 4,532,675 | A | 8/1985 | Salazar | |
| 4,628,568 | A | 12/1986 | Lee et al. | |
| 4,765,025 | A * | 8/1988 | Salazar | E05D 7/105 16/261 |
| 4,800,624 | A | 1/1989 | Whitefoot et al. | |
| 4,829,633 | A * | 5/1989 | Kassner | E05D 11/1085 16/322 |
| 5,074,010 | A | 12/1991 | Gignac et al. | |
| 5,218,738 | A | 6/1993 | Krajenke | |
| 5,311,644 | A | 5/1994 | Laforgerie | |
| 5,444,894 | A | 8/1995 | Heiler | |
| 5,452,501 | A | 9/1995 | Kramer et al. | |
| 5,474,344 | A | 12/1995 | Lee | |
| 5,590,441 | A * | 1/1997 | Spencer | E05D 5/062 16/265 |
| 6,070,296 | A * | 6/2000 | Abeln | E05D 7/105 16/334 |
| 6,105,208 | A | 8/2000 | Westerdale et al. | |
| 6,282,752 | B1 * | 9/2001 | Kluting | E05D 11/1085 16/322 |
| 6,317,922 | B1 | 11/2001 | Kondratuk | |
| 6,446,305 | B1 | 9/2002 | Kneeland | |
| 6,481,056 | B1 | 11/2002 | Jesse | |
| 6,532,627 | B2 * | 3/2003 | Audisio | E05D 11/1085 16/322 |
| 6,581,243 | B2 | 6/2003 | Parizel | |
| 6,601,268 | B2 | 8/2003 | Seo | |
| 6,687,953 | B1 | 2/2004 | Liang | |
| 6,728,993 | B1 | 5/2004 | Murayama | |
| 6,739,020 | B1 | 5/2004 | Morawetz | |
| 6,817,062 | B2 | 11/2004 | Cho | |
| 6,871,382 | B2 | 3/2005 | Murayama et al. | |
| 7,076,836 | B1 | 7/2006 | Butka | |
| 7,096,536 | B2 * | 8/2006 | Johnson | E05D 11/1085 16/334 |
| 7,469,446 | B1 | 12/2008 | Brown et al. | |
| 7,555,815 | B2 * | 7/2009 | Tate, Jr. | E05D 3/022 16/221 |
| 7,585,013 | B2 | 9/2009 | Brown et al. | |
| 8,015,668 | B2 * | 9/2011 | Wang | G06F 1/1681 16/338 |
| D842,562 | S | 3/2019 | McCallister | |
| 10,344,512 | B2 | 7/2019 | Bertani | |
| 2001/0025397 | A1 * | 10/2001 | Audisio | E05D 11/1085 16/334 |
| 2003/0226237 | A1 * | 12/2003 | Johnson | E05D 11/1085 16/300 |
| 2004/0187260 | A1 * | 9/2004 | Bruckner | E05D 11/1085 16/334 |
| 2004/0251696 | A1 | 12/2004 | Murayama et al. | |
| 2005/0204511 | A1 | 9/2005 | Wohlfarth | |
| 2005/0235460 | A1 | 10/2005 | Stewart | |
| 2006/0168757 | A1 * | 8/2006 | Duning | E05D 11/1085 16/49 |
| 2009/0133222 | A1 | 5/2009 | Ochiai | |
| 2009/0293228 | A1 * | 12/2009 | Sasa | E05D 11/1085 16/297 |
| 2010/0180419 | A1 | 7/2010 | Brown et al. | |
| 2012/0233813 | A1 | 9/2012 | Settsu et al. | |
| 2012/0233814 | A1 | 9/2012 | Minegishi | |
| 2013/0125344 | A1 * | 5/2013 | Courbon | E05D 11/1078 16/342 |
| 2013/0180177 | A1 * | 7/2013 | Lazarevich | E05D 11/0054 16/319 |
| 2017/0122018 | A1 * | 5/2017 | Huang | E05D 5/06 |
| 2020/0308887 | A1 * | 10/2020 | Raab | E05D 3/02 |

FOREIGN PATENT DOCUMENTS

| | | | |
|---|---|---|---|
| CA | 2423923 | A1 | 2/2003 |
| CA | 2277114 | C | 6/2004 |
| CA | 2431353 | A1 | 12/2004 |
| CA | 2431353 | C | 3/2007 |
| CA | 2423923 | C | 8/2007 |
| CA | 2541656 | C | 12/2009 |
| CA | 2779392 | C | 9/2014 |
| CA | 2998496 | A1 | 5/2017 |
| CA | 2998496 | C | 1/2020 |
| CN | 203515106 | U | 4/2014 |
| CN | 105298269 | B | 6/2017 |
| DE | 29614386 | U1 | 12/1996 |
| EP | 1555372 | B1 | 8/2007 |
| JP | 2010105483 | A | 5/2010 |
| KR | 19980038168 | U | 9/1998 |
| KR | 100826811 | B1 | 4/2008 |
| KR | 100892491 | B1 | 4/2009 |
| WO | 2008069071 | A1 | 6/2008 |

* cited by examiner

DOOR HINGE WITH INTEGRATED DOOR CHECK

FIELD

This application relates to the field of door hinges having an integrated door check.

INTRODUCTION

Vehicles, such as for example cars, vans, trucks, and recreational vehicles, commonly include a door check mechanism (also referred to simply as a 'door check'). A door check may provide one or more open retention positions at which a door is substantially inhibited from moving (i.e. absent a deliberate application of force by a user). The door check may also control the force required to open and close the door to inhibit the door slamming shut or opening too rapidly.

DRAWINGS

FIGS. 32A-33C are top, side elevation, and perspective views respectively of a conical spring washer, in accordance with an embodiment;

FIGS. 33A-33C are top, side elevation, and perspective views respectively of a wave spring, in accordance with an embodiment;

SUMMARY

Figure 1:
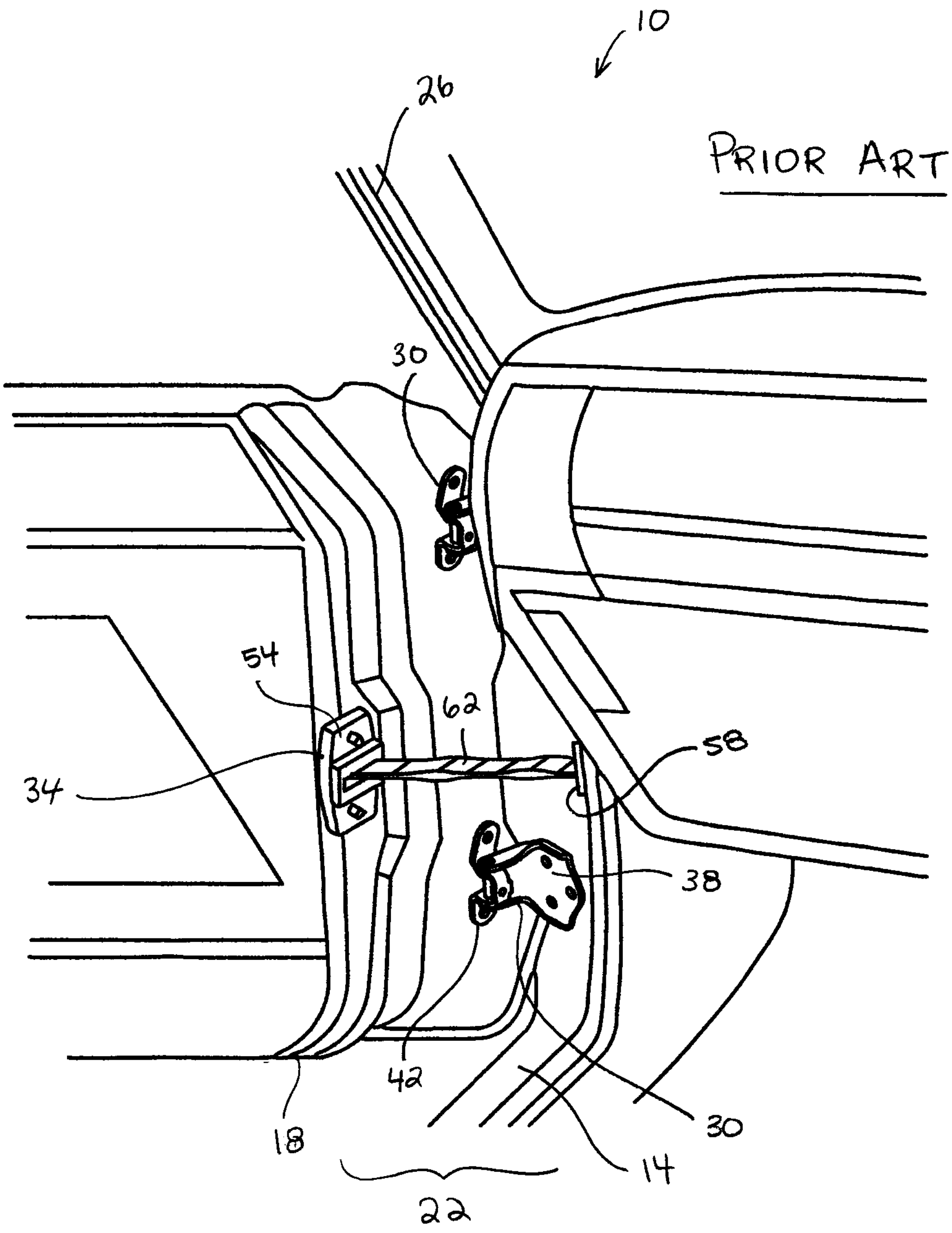
FIG. 1 is a partial perspective view of a vehicle with a prior art rotational connection between a vehicle body and vehicle door.

In one aspect, a vehicle door hinge with integrated door check is provided. The vehicle door hinge includes a vehicle body bracket, a vehicle door bracket, a hinge pin, a door check plate, and a resiliently compressible bias. The vehicle body bracket may be securable to a vehicle body. The vehicle door bracket may be securable to a vehicle door. The hinge pin may define an axially extending hinge rotation axis. The hinge pin may provide a rotational connection between the vehicle body bracket and the vehicle door bracket that allows the vehicle door bracket to rotate about the hinge rotation axis relative to the vehicle body bracket between a door closed position and one or more door retention positions. The hinge pin may include one or more bearings. The door check plate may have a bearing engagement surface that is (i) axially opposed to the bearings, (ii) in contact with the bearings, and (iii) surrounding the hinge rotation axis. The bearing engagement surface may define one or more semi-circular paths. Each of the bearings may travel along one of the semi-circular paths as the vehicle door bracket rotates from the door closed position to the one or more door retention positions. Each semi-circular path may have a first end corresponding to the door closed position, and an elevation profile with a variable elevation that includes one or more retention portions. Each retention portion may correspond to one of the door retention positions. The resiliently compressible bias may be positioned to axially bias the bearing engagement surface against the bearings.

In another aspect, a vehicle door hinge with integrated door check is provided. The vehicle door hinge includes a vehicle body bracket, a vehicle door bracket, a hinge pin, and a door check plate. The vehicle body bracket may be securable to a vehicle body. The vehicle door bracket may be securable to a vehicle door. The hinge pin may define an axially extending hinge rotation axis. The hinge pin may provide a rotational connection between the vehicle body bracket and the vehicle door bracket that allows the vehicle door bracket to rotate about the hinge rotation axis relative to the vehicle body bracket between a door closed position and one or more door retention positions. The hinge pin may include one or more bearings. The door check plate may have a bearing engagement surface that is (i) axially opposed to the bearings, (ii) in contact with the bearings, and (iii) surrounding the hinge rotation axis. The bearing engagement surface may define one or more semi-circular paths. Each of the bearings may travel along one of the semi-circular paths as the vehicle door bracket rotates from the door closed position to the one or more door retention positions. Each semi-circular path may have a first end corresponding to the door closed position, and an elevation profile with a variable elevation that includes one or more retention portions. Each retention portion may correspond to one of the door retention positions. The door check plate may be axially resiliently compressible and may axially bias the bearing engagement surface against the bearings.

In another aspect, a vehicle door hinge with integrated door check is provided. The vehicle door hinge includes a vehicle body bracket, a vehicle door bracket, and a hinge pin. The vehicle body bracket may be securable to a vehicle body. The vehicle door bracket may be securable to a vehicle door. The hinge pin may define an axially extending hinge rotation axis. The hinge pin may provide a rotational connection between the vehicle body bracket and the vehicle door bracket that allows the vehicle door bracket to rotate about the hinge rotation axis relative to the vehicle body bracket between a door closed position and one or more door retention positions. The hinge pin may include one or more bearings. A bearing engagement surface may be integrally formed into one of the vehicle body bracket and the vehicle door bracket. The bearing engagement surface may be (i) axially opposed to the bearings, (ii) in contact with the bearings, and (iii) surrounding the hinge rotation axis. The bearing engagement surface may define one or more semi-circular paths. Each of the bearings may travel along one of the semi-circular paths as the vehicle door bracket rotates from the door closed position to the one or more door retention positions. Each semi-circular path may have a first end corresponding to the door closed position, and an elevation profile with a variable elevation that includes one or more retention portions. Each retention portion may correspond to one of the door retention positions.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. 112*a*, or $\mathbf{112}_1$). Multiple elements herein may be identified by part numbers that share a base number in common and that differ by their suffixes (e.g. $\mathbf{112}_1$, $\mathbf{112}_2$, and $\mathbf{112}_3$). All elements with a common base number may be referred to collectively or generically using the base number without a suffix (e.g. 112).

Figure 2:
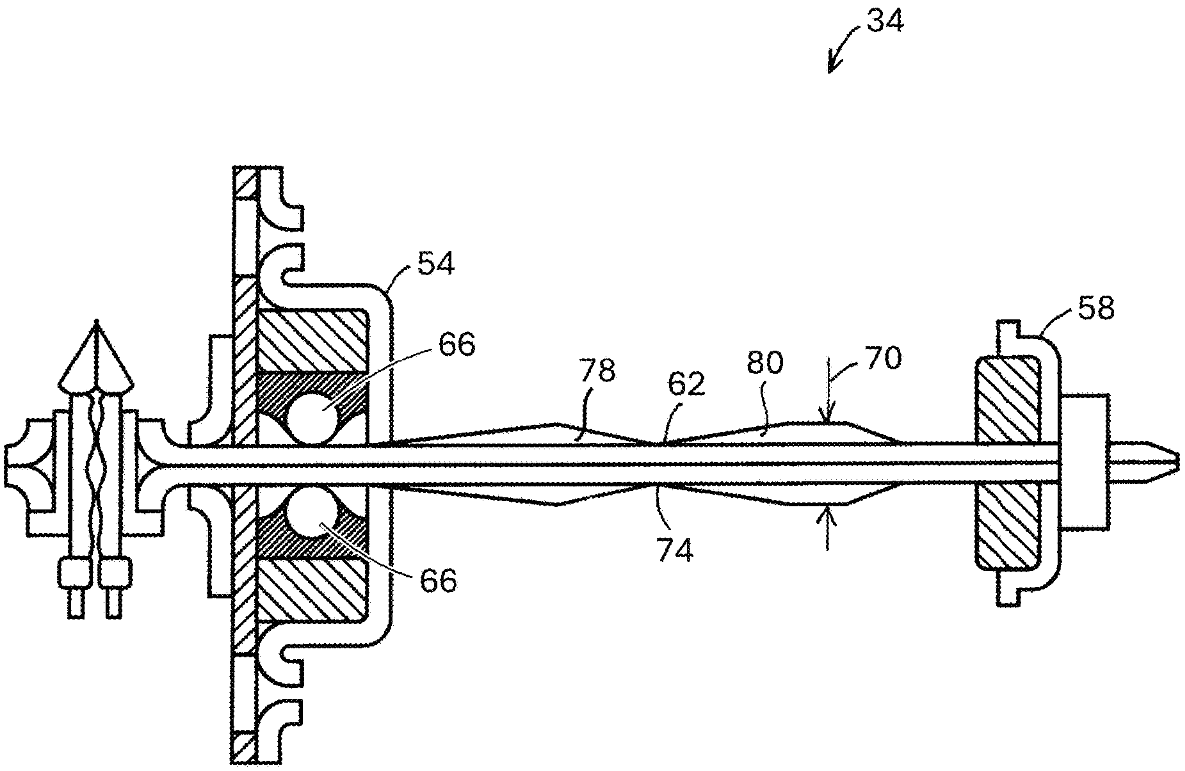
FIG. 2 (Prior Art)
FIG. 2 is a cross-sectional view of a prior art door check.
Figure 3:
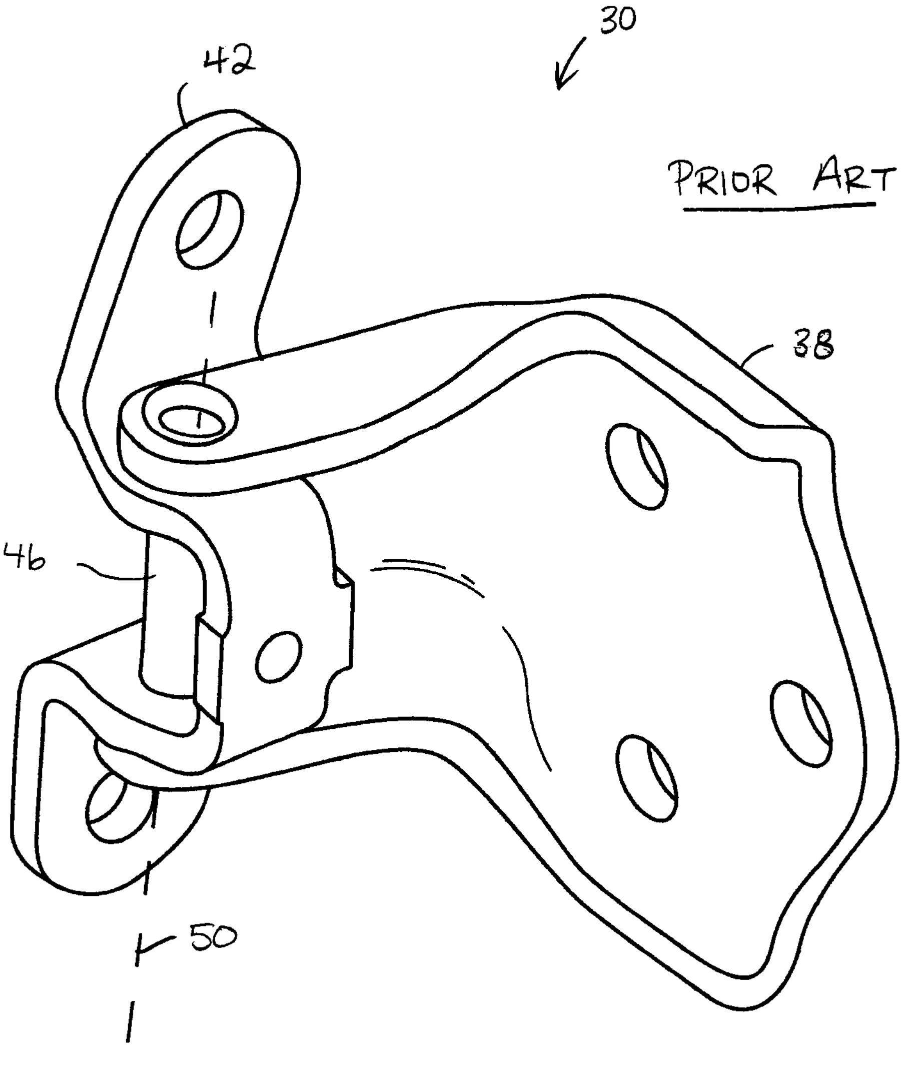
FIG. 3 is a perspective view of a prior art hinge.

Referring to FIGS. 1-3, a vehicle 10 may include a body 14 and one or more doors 18. Vehicle door 18 may have a rotational connection 22 to vehicle body 14 that allows vehicle door 18 to rotate between a door open position (shown in FIGS. 1 and 3) and a door closed position (shown in FIG. 2). In the door open position, things such as passengers and cargo may be loaded into the vehicle 10. In the door closed position, the vehicle door opening 26 may be closed by vehicle door 18, such as to inhibit things from fall out of the vehicle 10 through the vehicle door opening 26.

Rotational connection 22 may include one or more vehicle door hinges 30 and a door check 34. Vehicle door hinges 30 may include a vehicle body bracket 38 secured to vehicle body 14, a vehicle door bracket 42 secured to vehicle door 18, and a pin 46 that rotationally connects the vehicle body bracket 38 to the vehicle door bracket. As shown, pin 46 may define a hinge rotation axis 50. Vehicle body bracket 38 can rotate relative to vehicle door bracket 42 about hinge rotation axis 50 between a door closed position and a door open position.

Door check 34 may include a bearing assembly 54 mounted to vehicle door 18, an end stop 58 mounted to vehicle door 14, and a door check strap 62. Door check strap 62 has a thickness 70 that varies along its length. Bearing assembly 54 includes bearings 66 that clamp onto door check strap 62.

Door check 34 provides variable resistance to the rotation of vehicle door 18 based on the thickness profile of door check strap 62. Specifically, as vehicle door 18 is rotated between the door closed position (shown in FIG. 2) and the door open position (shown in FIGS. 1 and 3), bearings 66 slide along the length of door check strap 62. The rotation resistance imparted by bearings 66 is positively correlated to the thickness of the portion of door check strap 62 that is located between bearings 66. That is, bearings 66 provide greater rotation resistance when the portion of door check strap 62 that is between bearings 66 is thicker, and vice versa.

Door check 34 also provides an intermediate retention position 74, which allows vehicle door 18 to maintain a stable position intermediate the open and closed positions. As shown, door check strap 62 defines a retention position 74 at a thickness minima flanked on both sides by portions 78 and 80 of increasing thickness. From retention position 74, thickness 70 of door check strap 62 increases in both directions. Consequently (i) rotation resistance increases in both directions from retention position 74, and (ii) force interactions on the sloped surfaces of portions 78 and 80 urge door check 34 to return to retention position 74. Thus, absent a deliberate user application of force, door check 34 maintains vehicle door 18 in the intermediate position when bearings 66 are positioned at intermediate retention position 74.

Embodiments herein relate to a hinge that integrates a door check. The hinge may provide the variable rotation resistance and/or retention position(s) associated with a traditional door check, without having a discrete door check assembly. All else being equal, this may reduce complexity, cost, weight, assembly, and maintenance associated with the discrete door check assembly, while preserving functionality. Moreover, embodiments disclosed herein may be more compact, allowing the door check functionality to be added to assemblies that heretofore could not accommodate a discrete door check assembly (e.g. due to size constraints, mechanical limitations, cost, or aesthetics).

Figure 4:
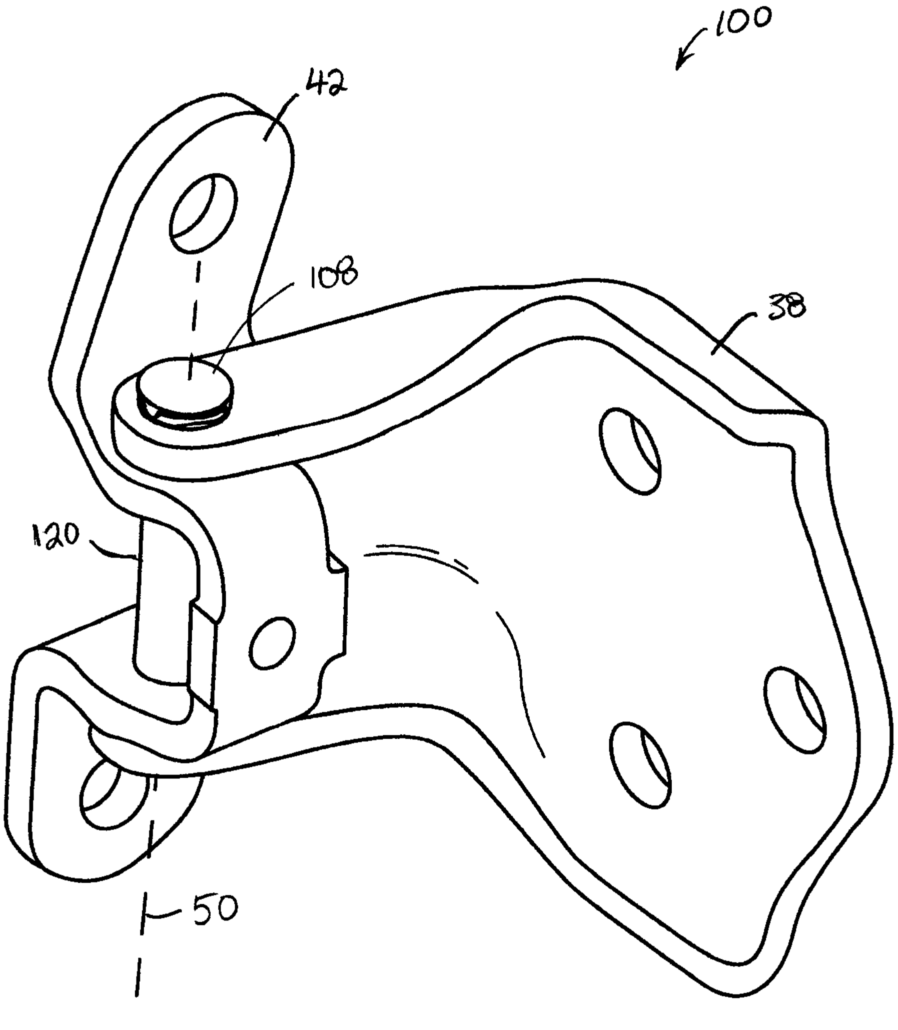
FIG. 4 is a perspective view of a hinge, in accordance with an embodiment.
Figure 5:
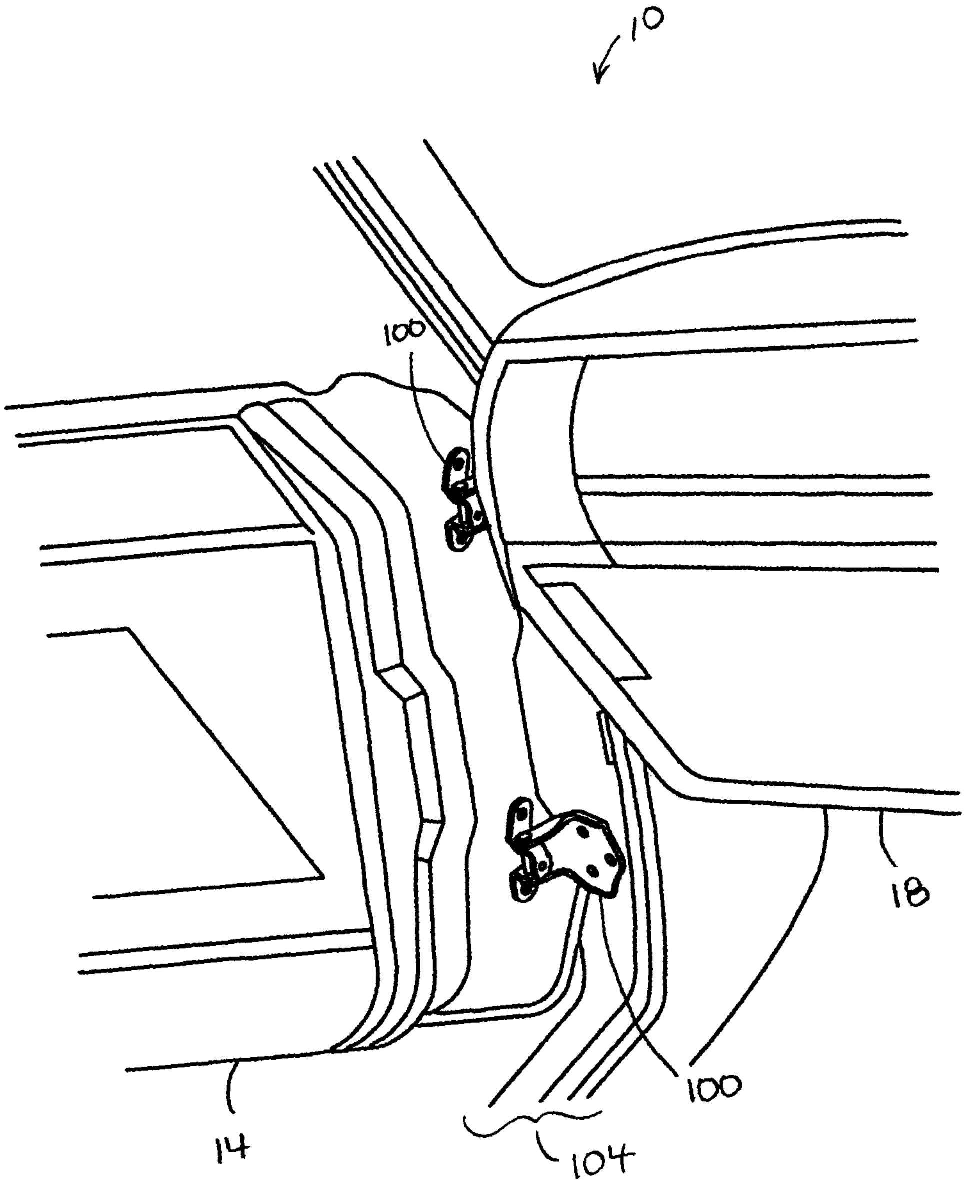
FIG. 5 is a partial perspective view of a vehicle with a rotational connection, in accordance with an embodiment.

FIG. 4 shows a hinge 100 in accordance with an embodiment. Hinge 100 may provide a rotational connection between any two objects. As an example, FIG. 5 shows a pair of hinges 100 providing a rotational connection 104 between a vehicle body 14 and a vehicle door 18. Generally, a vehicle 10 may include any number of (e.g. one to four) hinges 100 and any number of (e.g. none to four) traditional hinges (e.g. hinge 30 in FIG. 3) to collectively provide the rotational connection 104 between vehicle body 14 and vehicle door 18. The at least one hinge 100 may provide rotational connection 104 with features of a door check (e.g. such as door check 34 of FIG. 1). Accordingly, rotational connection 104 may be free of discrete door check assemblies (e.g. door check 34 in FIG. 1) as shown, which may reduce design complexity, manufacturing cost, weight, required assembly, and maintenance which might have otherwise been associated with providing the discrete door check.

More generally, hinge 100 may provide a rotational connectional to, for example any type of door (e.g. cupboard door, building door, access panel door, appliance door (e.g. refrigerator door, oven door, dishwasher door, or laundry machine door)), electronic device (e.g. flip-open cellular phone, laptop screen, or scanner lid), tool (e.g. guillotine paper cutter, or table saw), toy, or any other objects having a rotational connection between parts.

Figure 6:
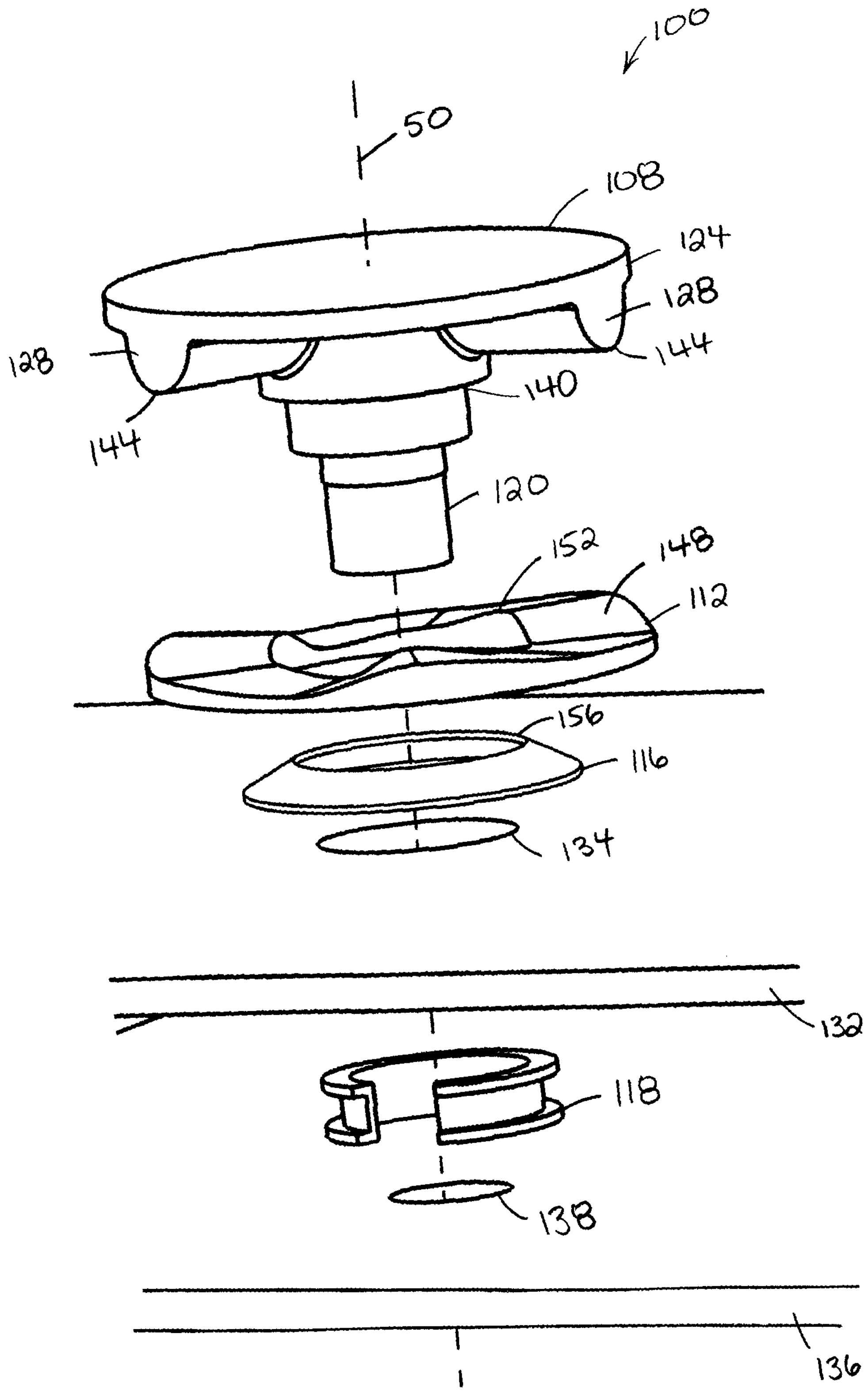
FIG. 6 is a partial exploded view of the hinge of FIG. 4.
Figure 7:
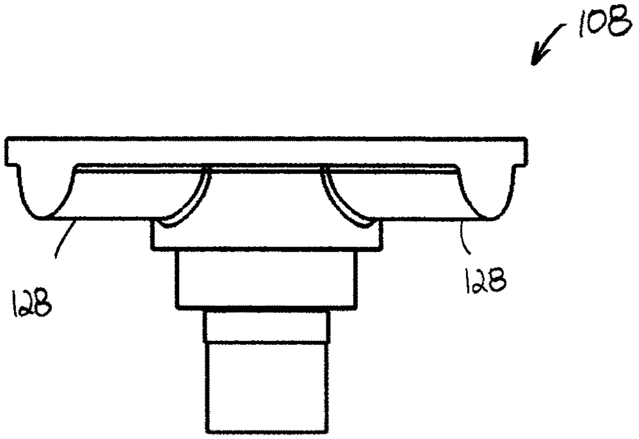
FIG. 7 is a side elevation view of a hinge pin, in accordance with an embodiment.
Figure 8:
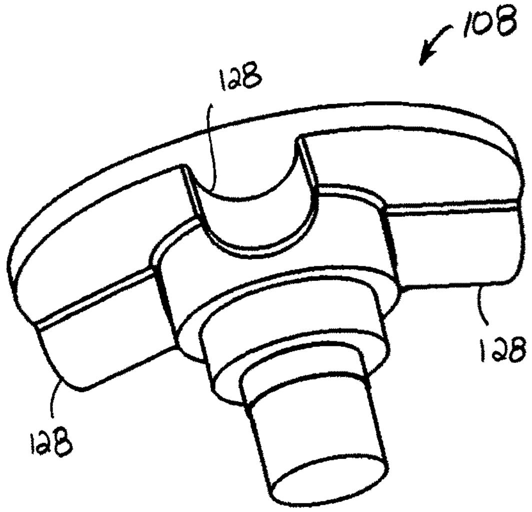
FIG. 8 is a bottom perspective view of the hinge pin of FIG. 7.
Figure 9:
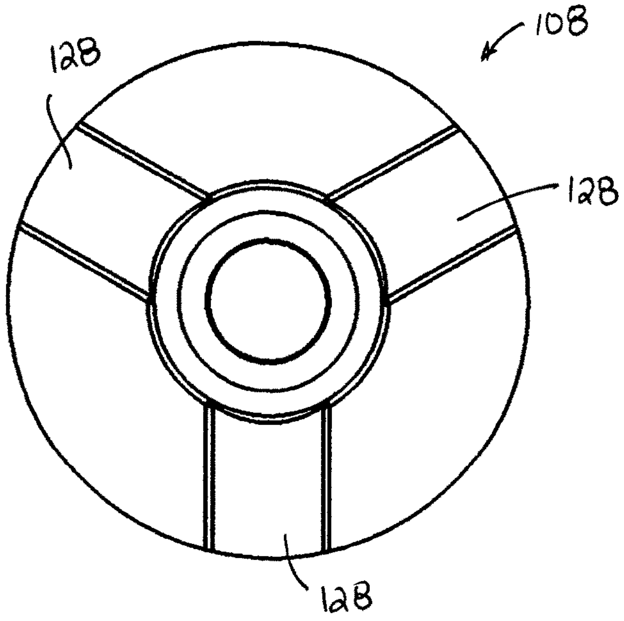
FIG. 9 is a bottom plan view of the hinge pin of FIG. 7.

Referring to FIGS. 4 and 6, hinge 100, in accordance with some embodiments, may include a first bracket 38 (securable to a first object, such as a vehicle body), a second bracket 42 (securable to a second object, such as a vehicle door), a hinge pin 108, a check plate 112, and a resiliently compressible bias 116. Hinge pin 108 may be connected to one of brackets 38 and 42 so that hinge pin 108 and the one bracket 38 or 42 rotate synchronously about hinge rotation axis 50. Similarly, check plate 112 may be connected to the other of brackets 38 and 42 so that check plate 112 and the one bracket 38 or 42 rotate synchronously about hinge rotation axis 50. In the illustrated embodiment, hinge includes a bushing 118 to reduce friction at the interface of hinge pin 108 and hinge bracket layer 132. Alternative embodiments may not include bushing 118.

In use, hinge pin 108 physically interacts with check plate 112 when first bracket 38 rotates relative to second bracket 42 about hinge rotation axis 50 to generate variable resistance and/or retention position(s), which are traditionally associated with a discrete door check (e.g. door check 34 of FIG. 1).

Hinge pin 108 may include a shaft 120, a bearing mount 124, and a plurality of bearings 128. As shown, hinge pin shaft 120 may extend co-axially with hinge rotation axis 50 through layers 132 and 136 of hinge brackets 38 and 42 respectively. In some embodiments, hinge pin shaft 120 may be rigidly connected to one of layers 132 and 136 so that hinge pin 108 rotates synchronously with the corresponding bracket 38 or 42. For example, hinge pin shaft 120 may be rigidly connected to one of layers 132 and 136 by a rivet, welds, fastener (e.g. bolt or screw), or by integrally forming hinge pin shaft 120 with the layer 132 or 136. Alternatively or in addition, hinge pin shaft 120 may be non-circularly shaped to key into a non-circular layer opening 134 or 138 so that hinge pin 108 rotates synchronously with the corresponding bracket 38 or 42.

Still referring to FIGS. 4 and 6, bearing mount 124 may be connected to hinge pin shaft 120. For example, bearing mount 124 may be rigidly connected to (e.g. integrally formed with) hinge pin shaft 120. In the illustrated example, bearing mount 124 is connected to an axial end 140 of hinge pin shaft 120. As shown, bearing mount 124 may carry a plurality of bearings 128. Bearings 128 may be positioned on bearing mount 124 so that they are axially opposed to check plate 112. This allows bearings 128 to physically engage check plate 112 as hinge rotates between positions.

Figure 38:
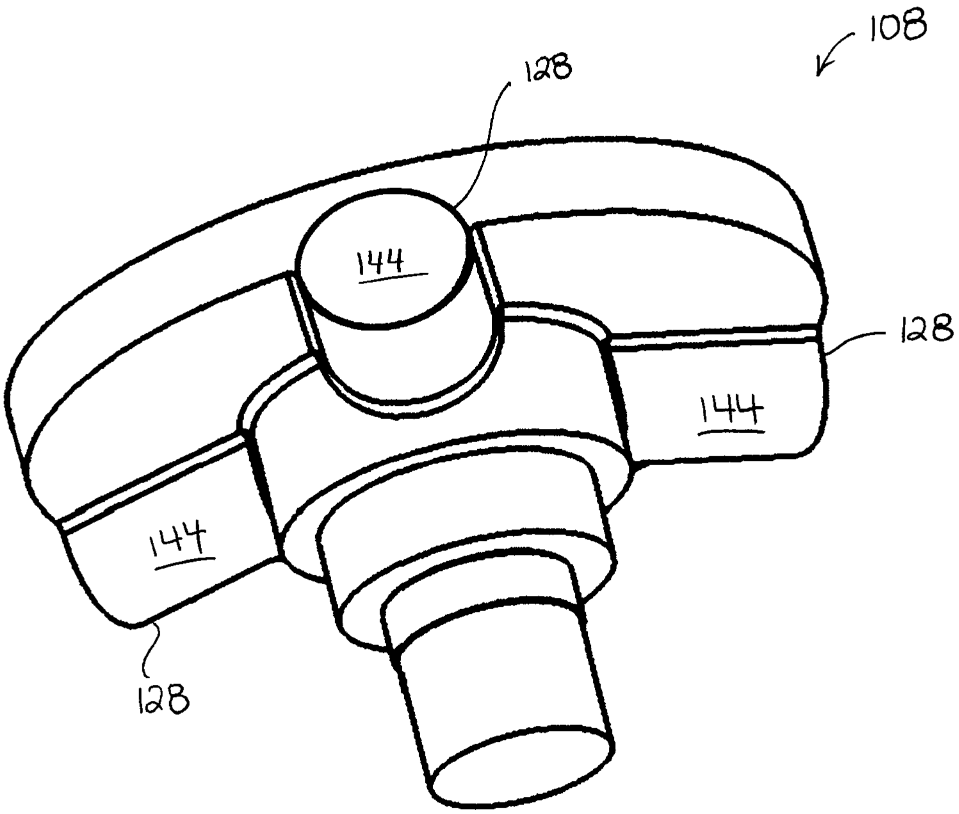
FIG. 38 is a bottom perspective view of a hinge pin with rolling engaging elements, in accordance with an embodiment.

Bearings 128 include engaging elements 144. Engaging elements 144 may be sliding elements and/or rolling elements. For example, FIG. 6 illustrates needle bearings 128 with semi-cylindrical sliders 144. As shown, sliding engaging elements 144 may be integrally formed with bearing mount 124. In some embodiments, hinge pin 108 may be integrally formed as one solid piece of material (e.g. metal or hard plastic)—including shaft 120, bearing mount 124, and bearings 128. FIG. 38 shows an embodiment in which bearings 128 includes rolling engaging elements 144. As shown, needling bearings 128 may include cylindrical rollers 144.

Referring to FIG. 6, check plate 112 may be positioned between hinge pin bearing mount 124 and hinge bracket layer 132. As shown, check plate 112 may include a bearing engagement surface 148 that is axially opposed to hinge pin bearings 128 and in contact with hinge pin bearings 128.

Check plate 112 may surround hinge pin shaft 120. For example, check plate 112 may have a central opening 152 intersected by hinge rotation axis 50. In use, bearings 128 may physically engage (e.g. slide over) bearing engagement surface 148, and this physical engagement may provide variable resistance and/or retention position(s), which are traditionally associated with a discrete door check.

Still referring to FIG. 6, resiliently compressible bias 116 may have any position and configuration suitable to urge hinge pin bearings 128 into constant contact with check plate bearing engagement surface 148. For example, resiliently compressible bias 116 may be positioned axially between check plate 112 and hinge bracket layer 132. In some embodiments, resiliently compressible bias 116 may surround hinge pin shaft 120. As shown, resiliently compressible bias 116 may have a central opening 156 intersected by hinge rotation axis 50. In use, resiliently compressible bias 116 may provide a variable spring force based on the rotational position of bearings 128 relative to bearing engagement surface 148. This variable spring force may cooperate with bearings 128 and bearing engagement surface 148 to provide variable resistance and/or retention position(s), which are traditionally associated with a discrete door check.

Referring to FIGS. 6-11, check plate bearing engagement surface 148 may define a plurality of curved (e.g. semi-circular) paths 160. Each semi-circular path 160 may include a first end 164 corresponding to a door closed position, and a second end 166. In use, each bearing 128 may move (e.g. slide) along a respective (i.e. different one of) semi-circular path 160 between the first and second ends 164, 168 as hinge 100 is rotated between the closed and open positions. As shown, each semi-circular path 160 may have an elevation profile with a variable elevation (i.e. the elevation changes along the semi-circular path 160).

The elevation profile of each semi-circular path 160 may include (i) one or more upwardly sloped portions 168 where the elevation profile is sloped such that it increases in a direction towards the first end 164, (ii) one or more downwardly sloped portions 172 where the elevation profile is sloped such that it decreases in a direction towards the first end 164, and (iii) one or more retention portions 176 extending from a low-elevation end of an upwardly sloped portion 168 and a low-elevation end of a downwardly sloped portion 172. Upwardly sloped portions 168 and downwardly sloped portions 172 may collectively form at least 50% or at least 70% of each semi-circular path 160, such that there may be a generally continuously changing rotation resistance between ends 164, 166 and any retention positions 176.

Each semi-circular path 160 may be substantially identical. That is, the semi-circular path 160 associated with each hinge pin bearing 128 may be substantially the same as the semi-circular path 160 associated with each other hinge pin bearing 128. Further, semi-circular paths 160 may be symmetrically distributed to allow the path-positions engaged by all hinge pin bearings 128 at a given moment to have the same elevation. In the illustrated embodiment, hinge pin 108 includes three bearings 128 circumferentially distributed (e.g. circumferentially spaced apart) around hinge rotation axis 50, and similarly check plate 112 includes three semi-circular paths 160. In other embodiments, hinge pin 108 may include any number of bearings 128 (and corresponding number of semi-circular paths 160), such as for example, one to twenty bearings 128 and semi-circular paths 160. For the application of a vehicle door 18, three semi-circular paths 160 of up to 120 degrees each (e.g. 90 to 120 degrees) provides a suitable range of motion.

Check plate bearing engagement surface 148 may be hard (e.g. substantially non-compressible). For example, check plate bearing engagement surface 148 may be composed of metal, stone, or hard plastic. This may allow the hard rolling or sliding engaging elements 144 of bearings 128 to roll or slide better across check plate bearing engagement surface 148.

Figure 12:
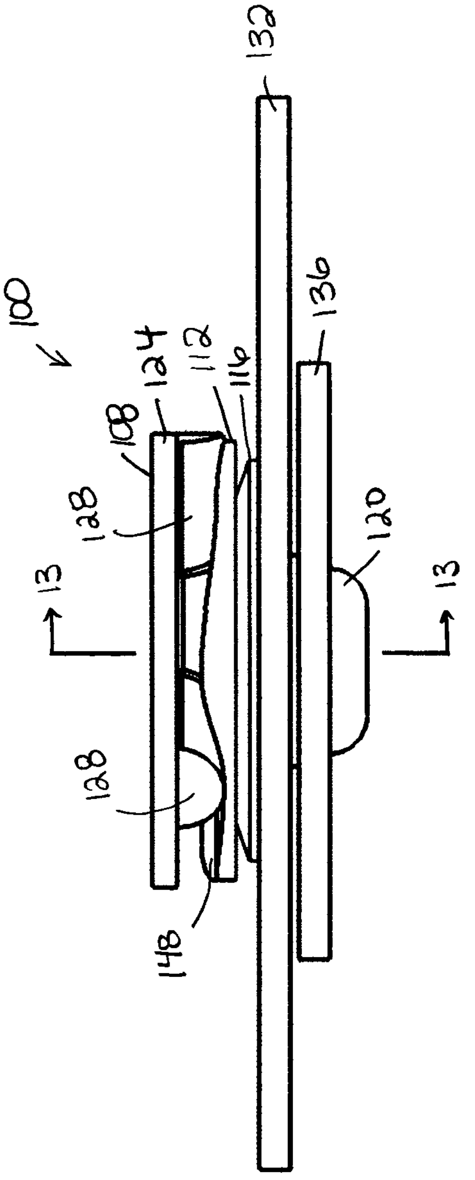
FIG. 12 is a partial side elevation view of the hinge of FIG. 4, in a first position.
Figure 13:
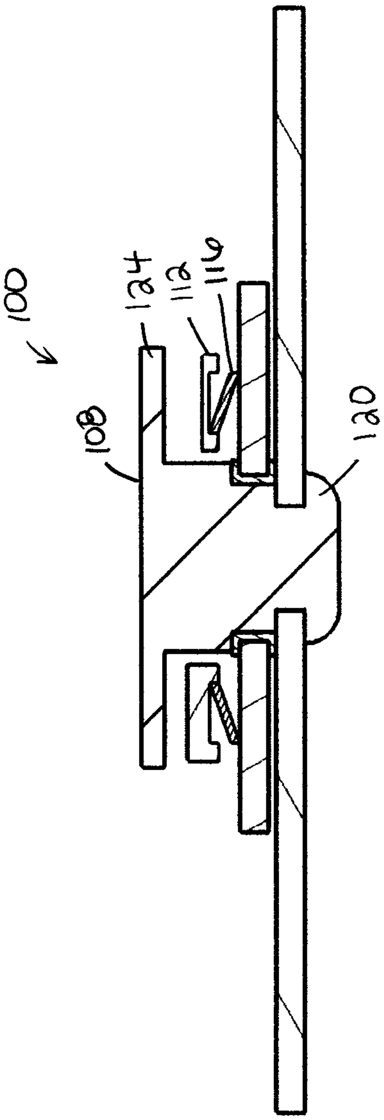
FIG. 13 is a cross-sectional view taken along line 13-13 in FIG. 12.
Figure 14:
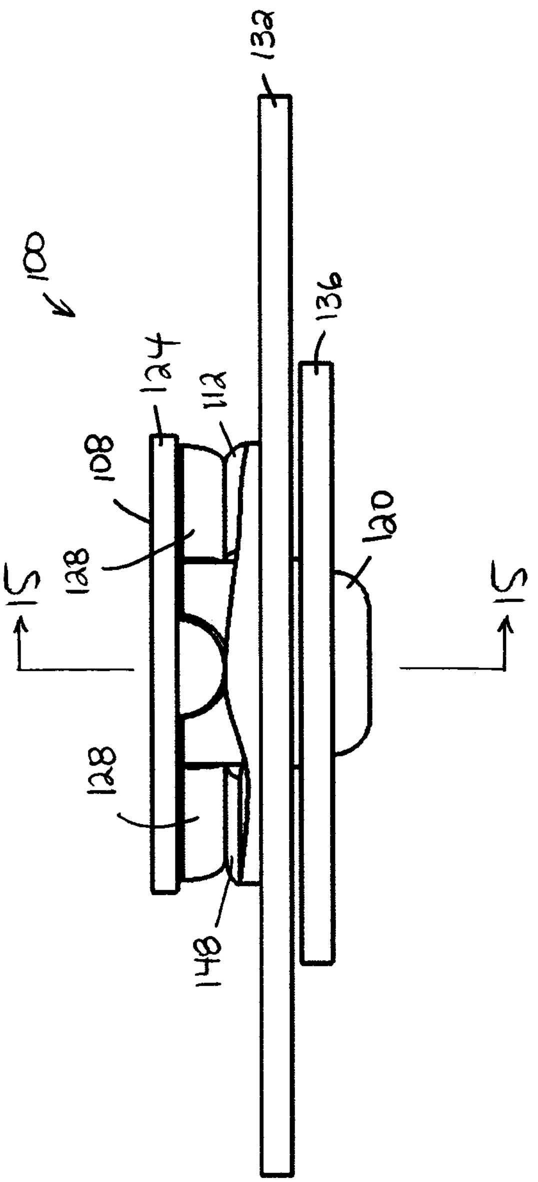
FIG. 14 is a partial side elevation view of the hinge of FIG. 4, in a second position.
Figure 15:
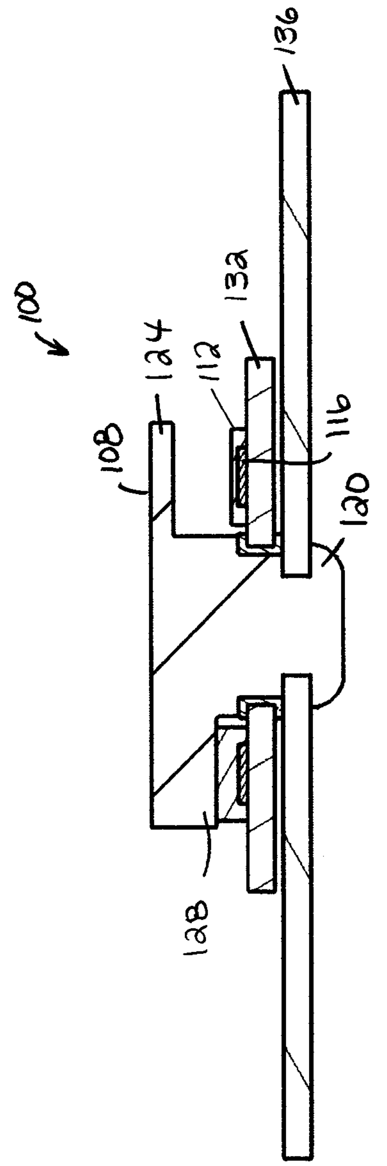
FIG. 15 is a cross-sectional view taken along line 15-15 in FIG. 14.

FIGS. 12-13 show that when hinge pin bearings 128 engage a low-elevation portion of their respective semi-circular paths 160 (FIG. 10) on check plate bearing engagement surface 148, resiliently compressible bias 116 is relatively less compressed. FIGS. 14-15 show that when hinge pin bearings 128 engage a higher-elevation portion of their respective semi-circular paths 160 (FIG. 10) on check plate bearing engagement surface 148, resiliently compressible bias 116 is relatively more compressed. Accordingly, when hinge pin bearings 128 move along sloped portions of their semi-circular paths 160, there will be rotational resistance created when moving "uphill" (i.e. in a direction of increasing elevation) because doing so involves forcing resiliently compressible bias 116 to further compress, and vice versa.

Returning to FIGS. 6-11, when the position of hinge 100 is such that hinge pin bearings 128 are located on upwardly sloped portions 168, rotation towards first end 164 may be resisted. In some cases, the forces generated at the interface of bearings 128 and bearing engagement surface 148 may urge hinge 100 to rotate "downhill" towards second end 166. Similarly, when the position of hinge 100 is such that hinge pin bearings 128 are located on downwardly sloped portions 172, rotation towards second end 166 may be resisted. In some cases, the forces generated at the interface of bearings 128 and bearing engagement surface 148 may urge hinge 100 to rotate "downhill" towards first end 164.

When the position of hinge 100 is such that hinge pin bearings are located at retention portions 176, rotations towards the first and second ends 164, 168 may both entail bearings 128 climbing "uphill" and thus, rotation away from retention portions 176 is resisted. Within each semi-circular path 160, each retention portion 176 corresponds with a retention position for hinge 100 where rotating hinge 100 is inhibited absent deliberate user application of force. Thus, the object (e.g. vehicle door) whose rotation is controlled by hinge 100 may be stably positioned at the retention position (e.g. intermediate or fully open position) until deliberately rotated away.

In some embodiments, the prevailing spring force of resiliently compressible bias 116, which produces reciprocal forces at the interfaces of hinge pin bearings 128 and check plate bearing engagement surface 148, may be responsible for producing some rotational resistance. For example, bearing movement along level (i.e. non-sloped) portions of semi-circular paths 160 may exhibit greater rotational resistance where those portions are characterized by higher elevations. This can allow the elevations of semi-circular paths 160 to contribute rotational resistance independent of slope.

In some embodiments, the rotational resistance is attributable to check plate bearing engagement surface 148 being soft (e.g. resiliently compressible). For example, check plate 112 may include a bearing engagement surface composed of rubber. In other embodiments, hinge pin bearings 128 may have a design that exhibits substantial resistance to sliding at high loads (such as forces produced by bias 116) even when check plate bearing engagement surface 148 is rigid (e.g. composed of metal, stone, or hard plastic).

Figure 16:
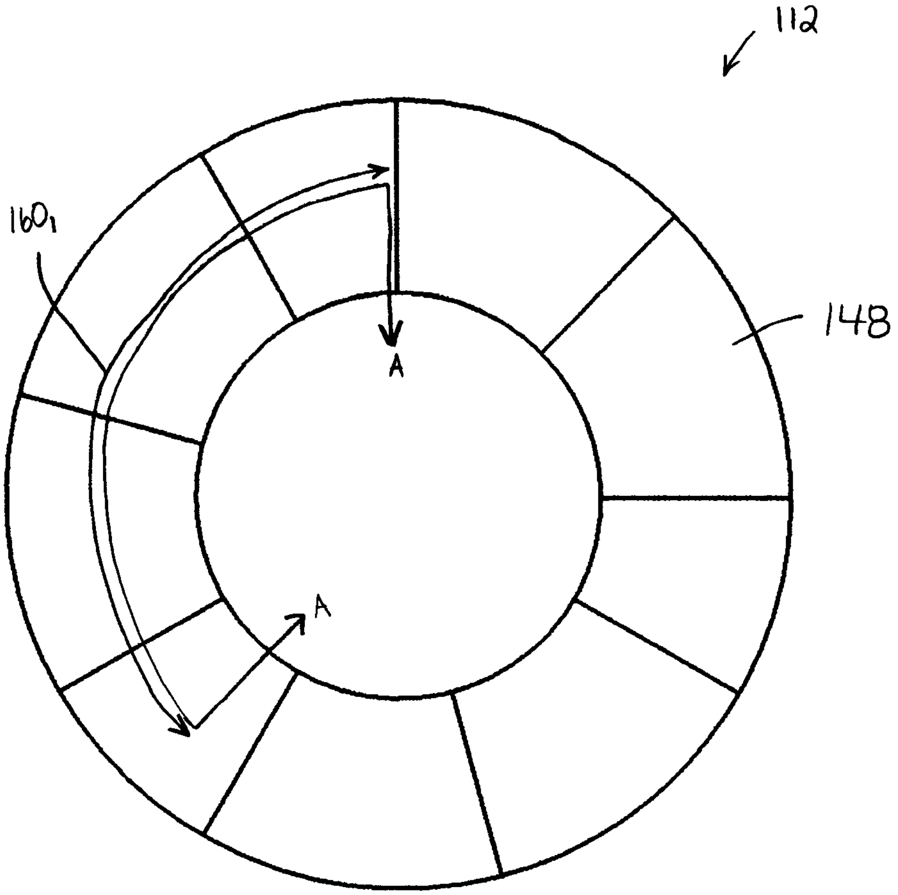
FIG. 16 is a top plan view of a check plate in accordance with an embodiment.
Figure 17:
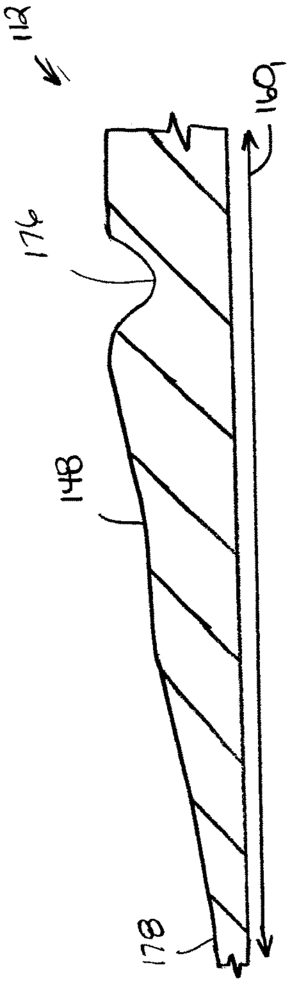
FIGS. 17-19 are cross-sectional views taken along line A-A in FIG. 16, in accordance with various embodiments.
Figure 18:
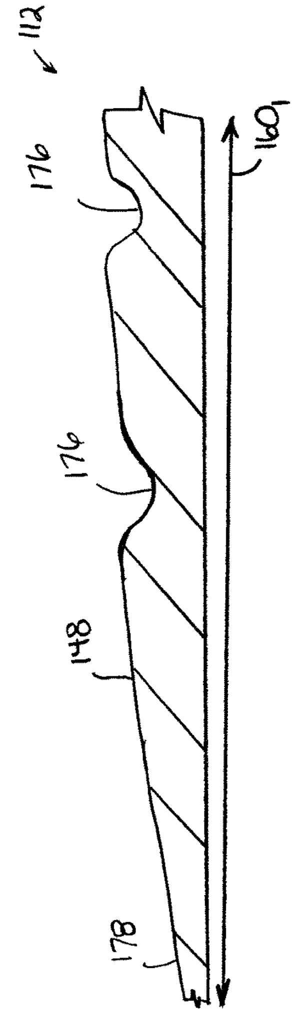
Figure 19:
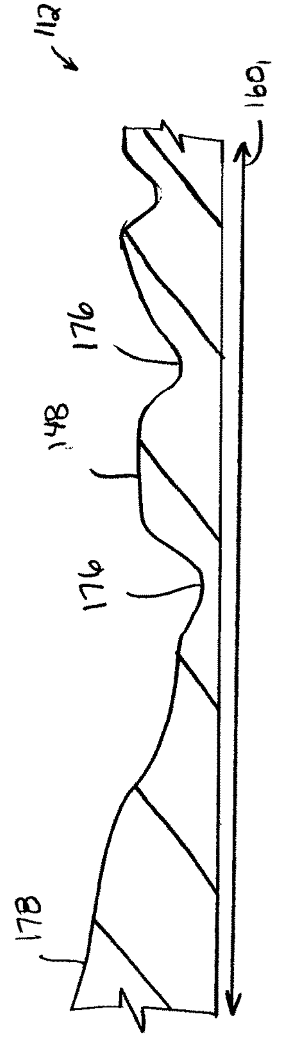

FIG. 16 is a top plan view of a check plate bearing engagement surface 148. FIGS. 17-19 are examples of elevation profiles 178 along a semi-circular path 160$_1$ of check plate bearing engagement surface 148. As shown, semi-circular path 160$_1$ can have any elevation profile of variable elevation along the path length. Further, semi-circular path 160$_1$ can have any number of retention portions 176 (e.g. one to ten retention portions 176)—where each retention portion 176 corresponds to a retention position for the hinge. FIG. 17 shows an example with one retention portion 176, FIG. 18 shows an example with two retention portions 176, and FIG. 19 shows an example with three retention portions 176.

Figure 20:
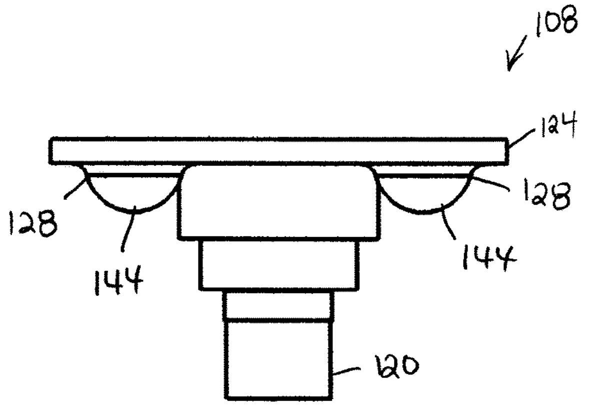
FIG. 20 is a side elevation view of a hinge pin, in accordance with an embodiment.
Figure 21:
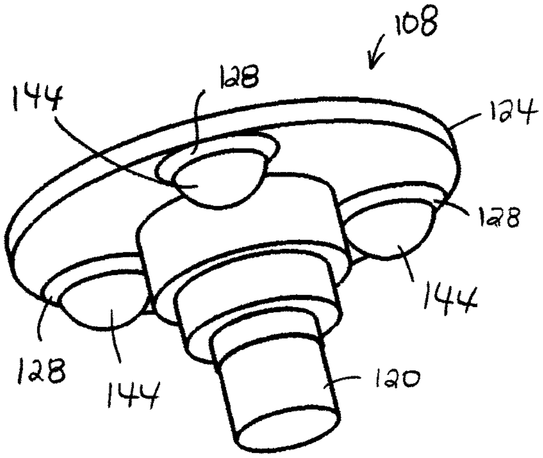
FIG. 21 is a bottom perspective view of the hinge pin of FIG. 20.
Figure 22:
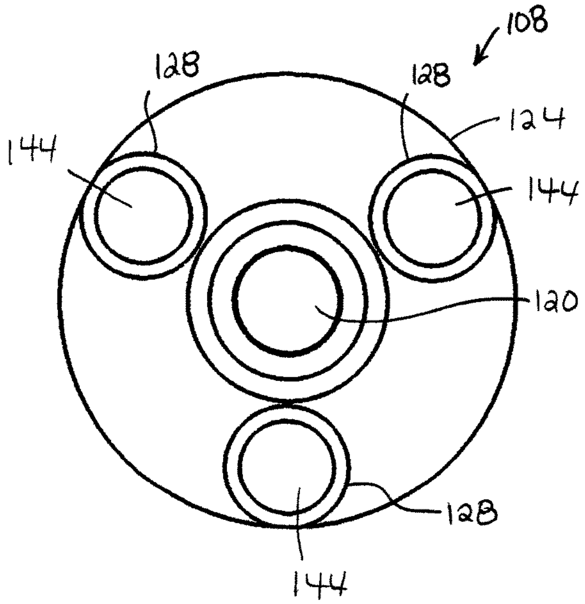
FIG. 22 is a bottom plan view of the hinge pin of FIG. 20.
Figure 23:
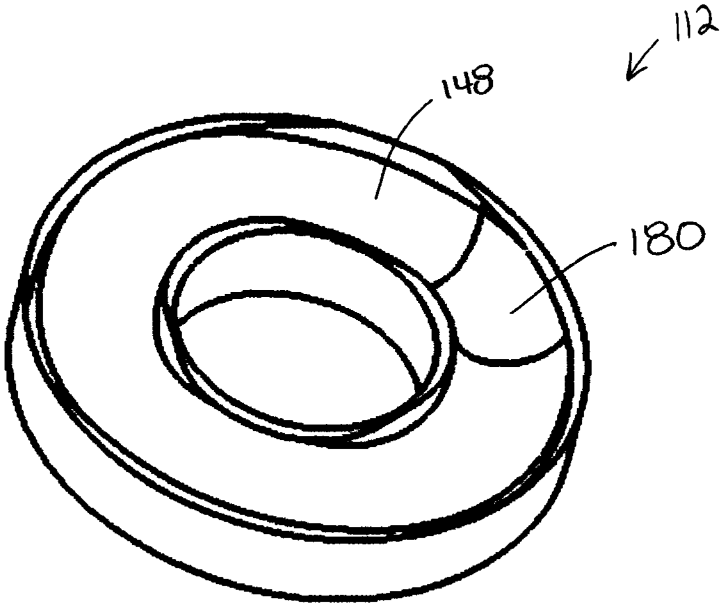
FIG. 23 is a perspective view of a check plate in accordance with another embodiment.

The hinge pin can include bearings of any size, shape, and configuration suitable for sliding across check plate bearing engagement surface. FIGS. 6-9 show an example of hinge pin 108 that includes needle bearings 128. FIGS. 20-22 show an alternative embodiment of hinge pin 108 that includes bearings 128 having engaging elements 144, which may be semi-spherical sliding elements or spherical rolling elements.

Referring to FIGS. 23-27, in some embodiments, check plate bearing engagement surface 148 may be formed as a transversely concave track 180 (i.e. concave in cross-sections transverse to semi-circular paths 160—e.g. cross-sections taken alone radial planes). Concave track 180 may be sized to mate with bearings 128 (FIG. 21), and may help to maintain alignment between bearings 128 (FIG. 21) and semi-circular paths 160.

Figure 27:
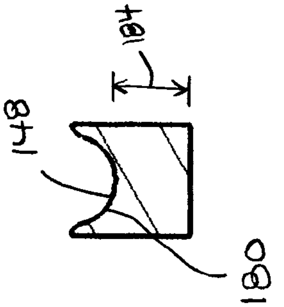
FIG. 27 is a cross-sectional view taken along line 27-27 in FIG. 24.
Figure 26:
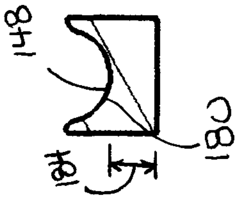
FIG. 26 is a cross-sectional view taken along line 26-26 in FIG. 24.
Figure 25:
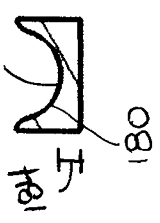
FIG. 25 is a cross-sectional view taken along line 25-25 in FIG. 24.
Figure 24:
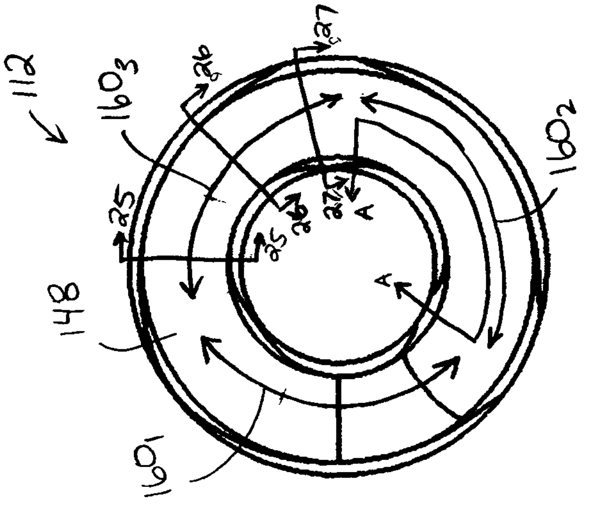
FIG. 24 is a top plan view of the check plate of FIG. 23.

Each semi-circular path 160 may have any elevation profile described and shown herein with association with this and other embodiments of bearing engagement surface 148, including the embodiment of FIGS. 10-13 which has a flat surface instead of a transversely concave surface 148. For example, FIGS. 25-27 show cross-sections taken at different positions along semi-circular path 160, each one with a different elevation 184. In some embodiments, semi-circular paths 160 may have any of elevation profiles 178 shown and described with reference to FIGS. 17-19.

Figure 10:
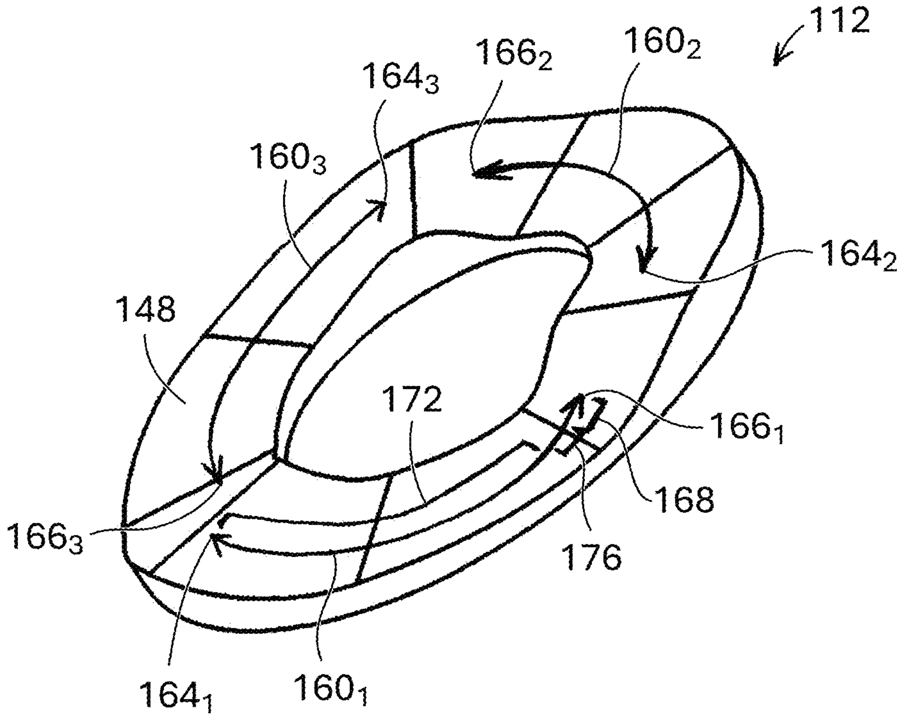
FIG. 10 is a top perspective view of a check plate, in accordance with an embodiment.
Figure 11:
FIG. 11 is a side elevation view of the check plate of FIG. 10.
Figure 28:
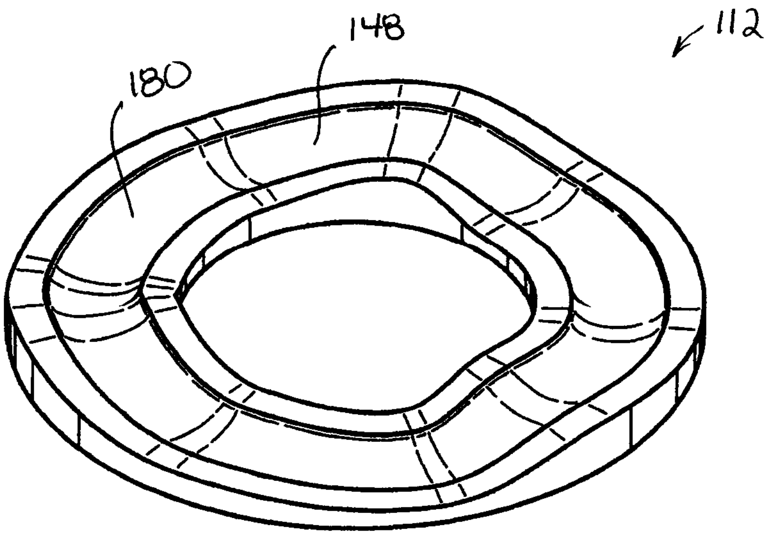
FIG. 28 is a top perspective view of a check plate, in accordance with an embodiment.
Figure 29:
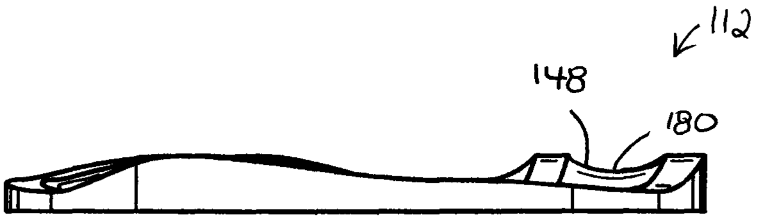
FIG. 29 is a side elevation view of a check plate, in accordance with an embodiment.

As a further example, FIGS. 28-29 show an embodiment of check plate 112 having a check plate bearing engagement surface 148 formed with a transversely concave track 180 and an elevation profile similar to check plate 112 of FIG. 10.

Figure 30:
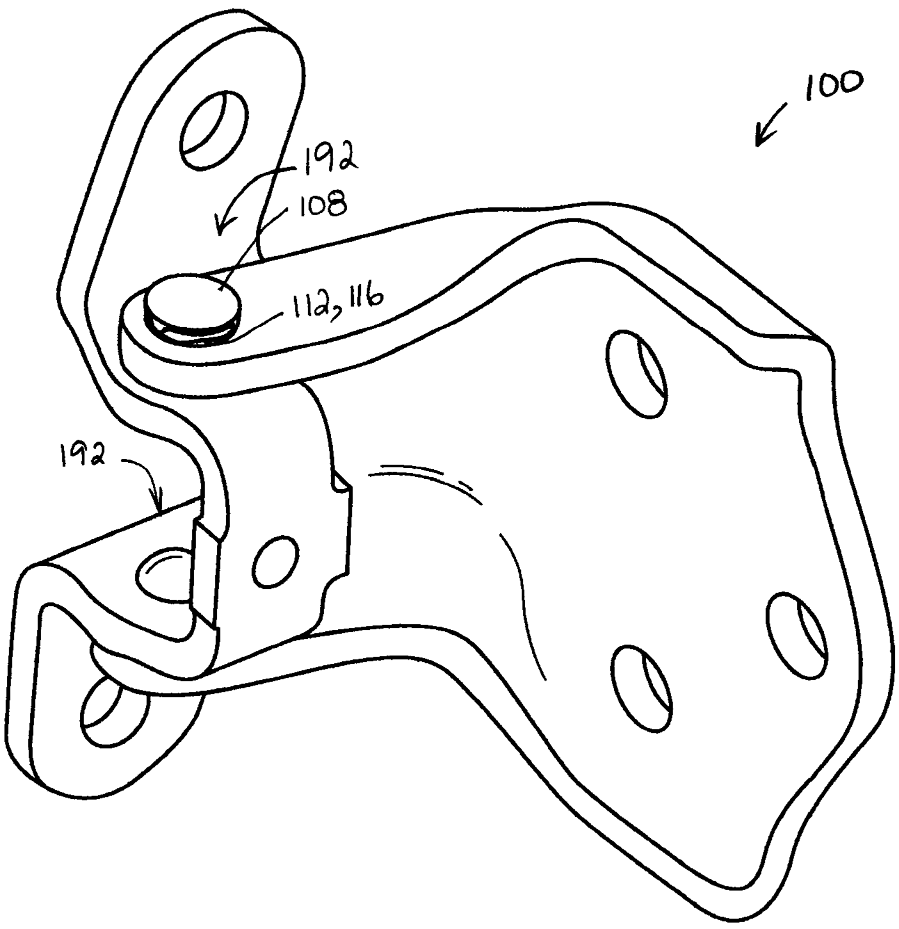
FIG. 30 is a perspective view of a hinge, in accordance with an embodiment.

FIG. 30 shows an embodiment of hinge 100 having two door check integrated pin assemblies 192 having any configuration described herein. For example, each assembly 192 may include a hinge pin 108, a check plate 112, and a resiliently compressible bias 116 as shown in FIG. 6.

Figure 31C:
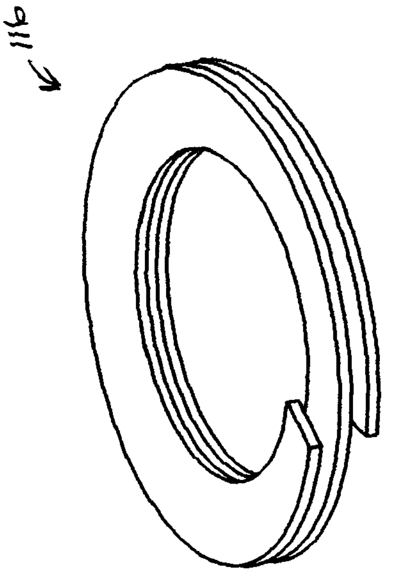
FIGS. 31A-31C are top, side elevation, and perspective views respectively of a coil spring, in accordance with an embodiment.
Figure 31A:
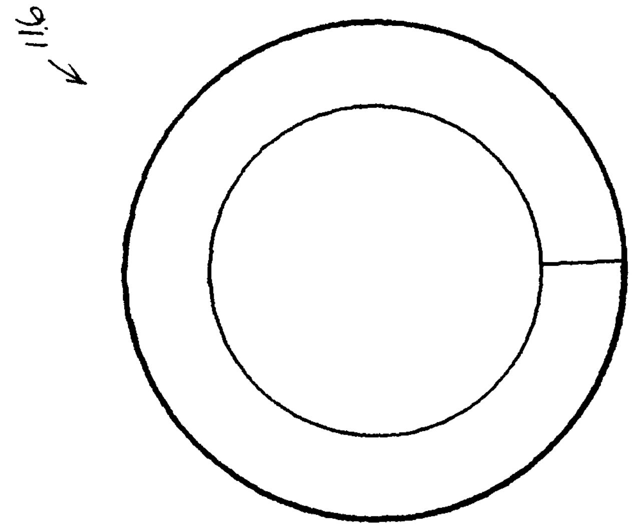
Figure 31B:
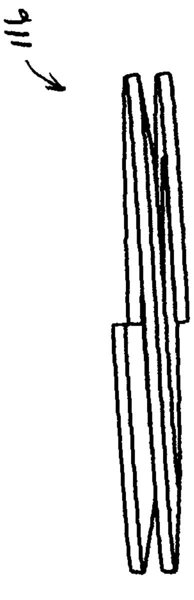
Figure 32C:
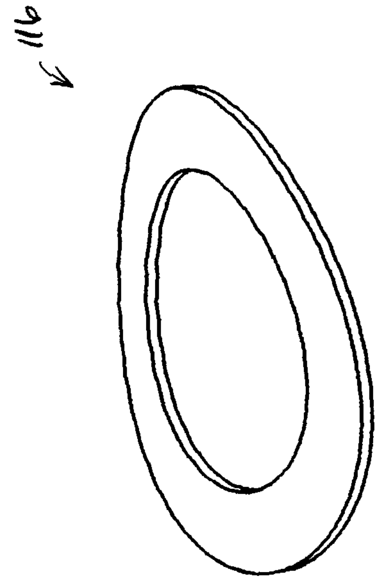
Figure 32A:
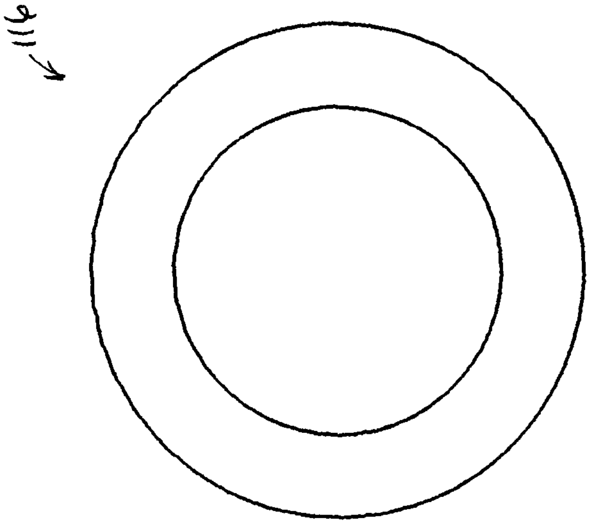
Figure 32B:
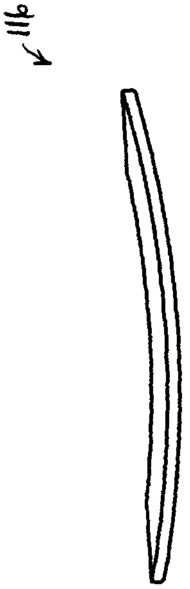
Figure 33C:
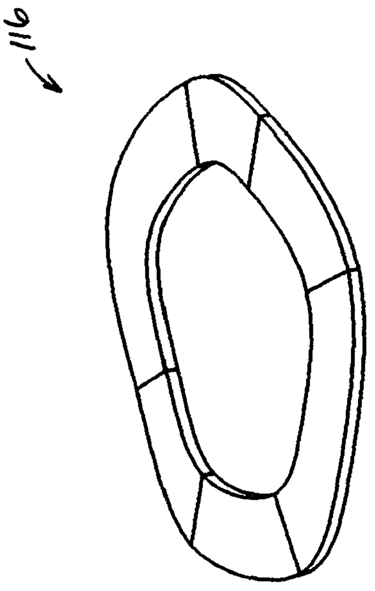
Figure 33A:
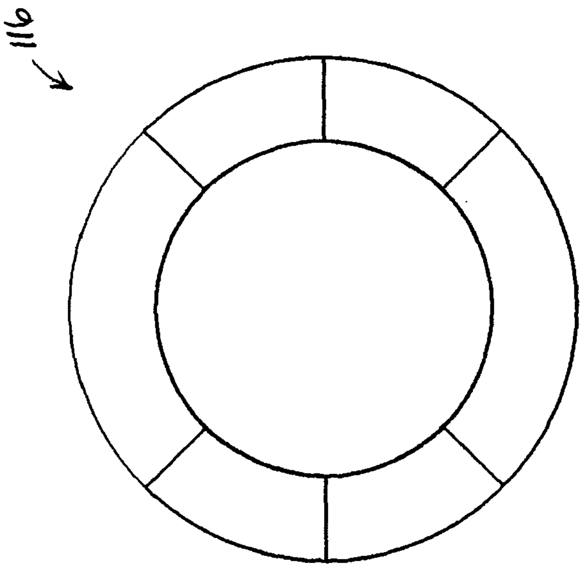
Figure 33B:

Referring to FIG. 6, hinge 100 may include any resiliently compressible bias suitable to urge hinge pin bearings 128 into constant contact with check plate bearing engagement surface 148. In the illustrated example, resiliently compressible bias 116 is a coned-disc spring (also referred to as conical spring washer or disc spring). Alternatively or in addition, hinge 100 may include a coil spring 116 (see, e.g. FIGS. 31A-31C), a conical spring washer 116 (see, e.g. FIGS. 32A-32C), a wave spring 116 (see, e.g. FIGS. 33A-33C), or a resiliently compressible bias of another design. In some embodiments, resiliently compressible bias may be composed of, e.g. a flat cylindrical disc of resiliently compressible material such as for example rubber.

Figure 34A:
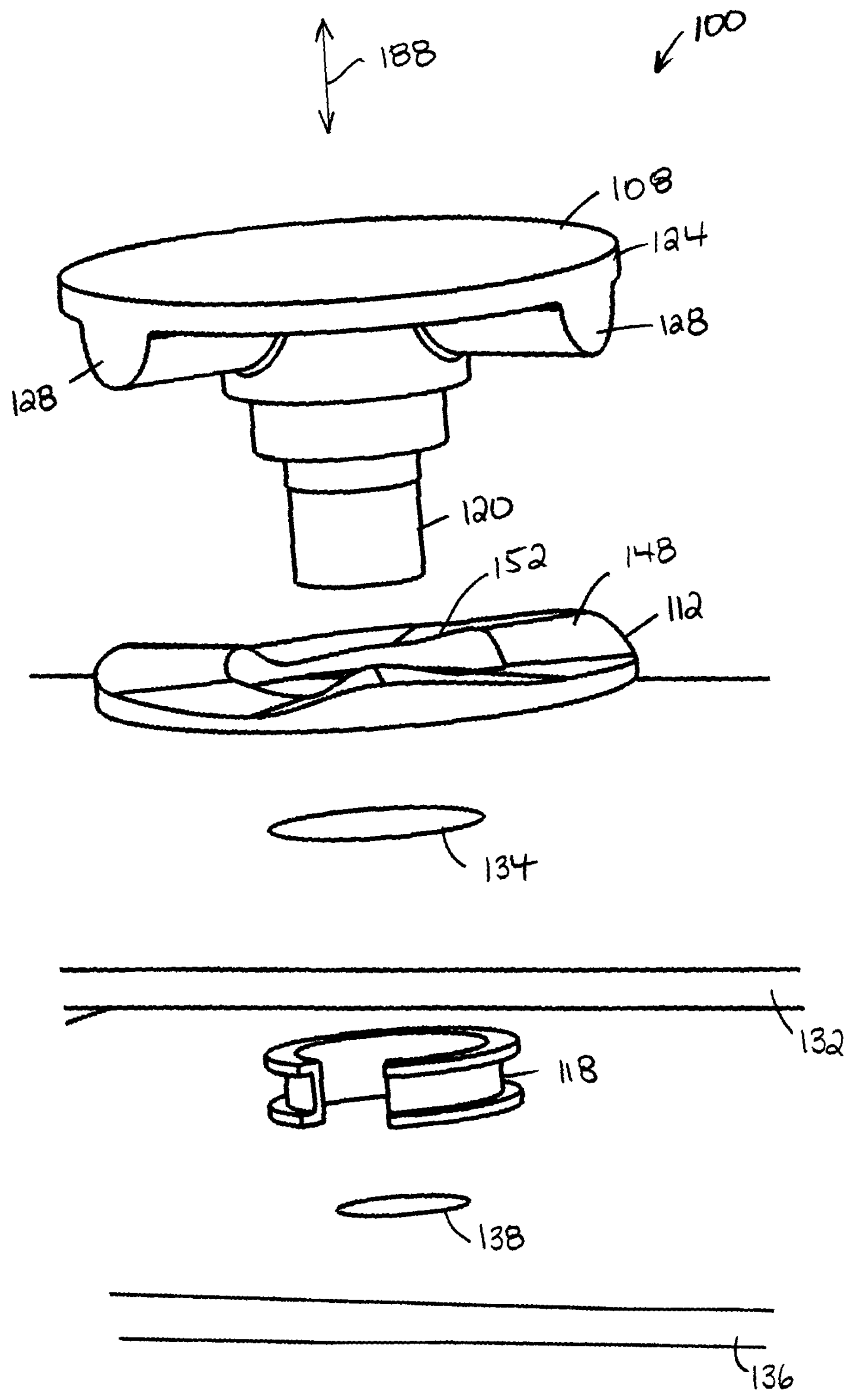
FIG. 34A is a partial exploded view of a hinge in accordance with another embodiment.

Referring to FIG. 34A, in some embodiments hinge 100 may not include a discrete resiliently compressible bias 116. Instead, the hinge 100 may include a check plate 112 that is resiliently compressible in at least the axial direction 188. For example, check plate 112 may be entirely or partially composed of a resiliently compressible material, such as rubber. An advantage of this design is that it may omit the resiliently compressible bias, which may reduce the unit cost, part count, and size hinge 100. For example, check plate bearing engagement surface 148 may be composed of a rigid material (e.g. metal, stone, or hard plastic) and a remainder of check plate 112 below check plate bearing engagement surface 148 may be composed of a resiliently compressible material (e.g. rubber).

Figure 34B:
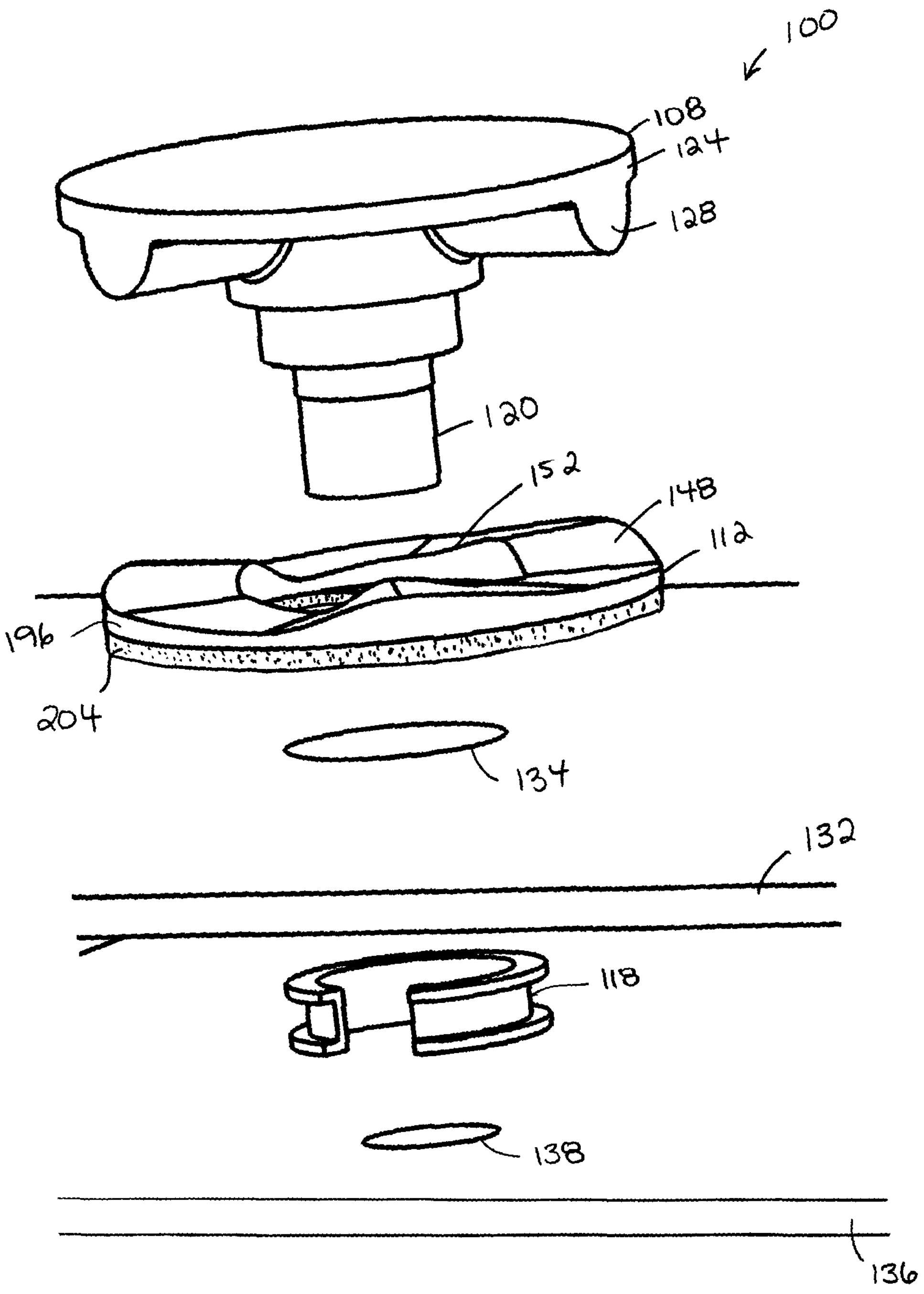
FIG. 34B is a partial exploded view of a hinge in accordance with another embodiment.

FIG. 34B shows an alternative embodiment in which check plate 112 includes an upper portion 196 (including check plate bearing engagement surface 148) composed of rigid material (e.g. metal, stone, or hard plastic), and a lower portion 204 composed of resiliently compressible material (e.g. rubber). Lower portion 204 may be permanently joined (e.g. by adhesive or other means) to upper portion 196.

Figure 35:
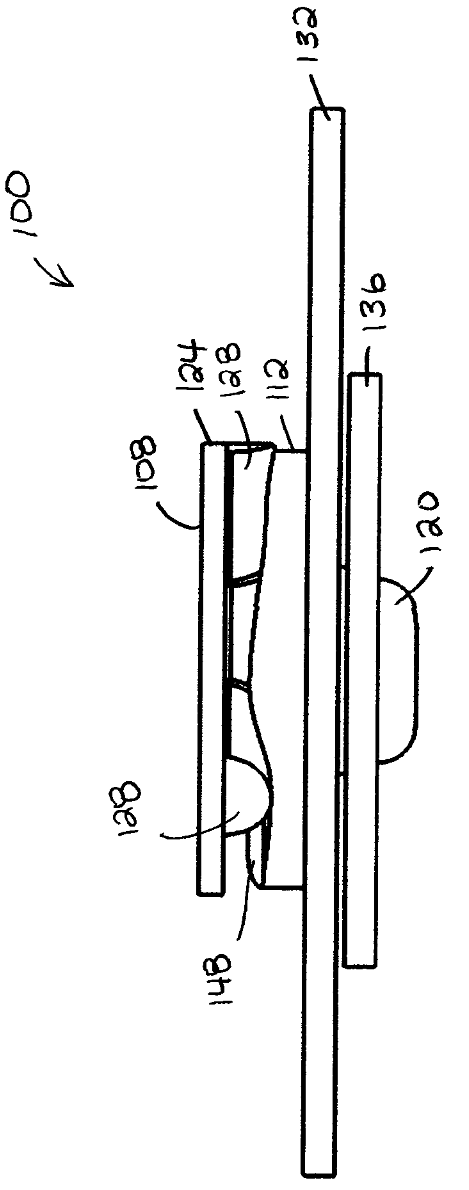
FIG. 35 is a partial side elevation view of the hinge of FIG. 34A, in a first position.
Figure 36:
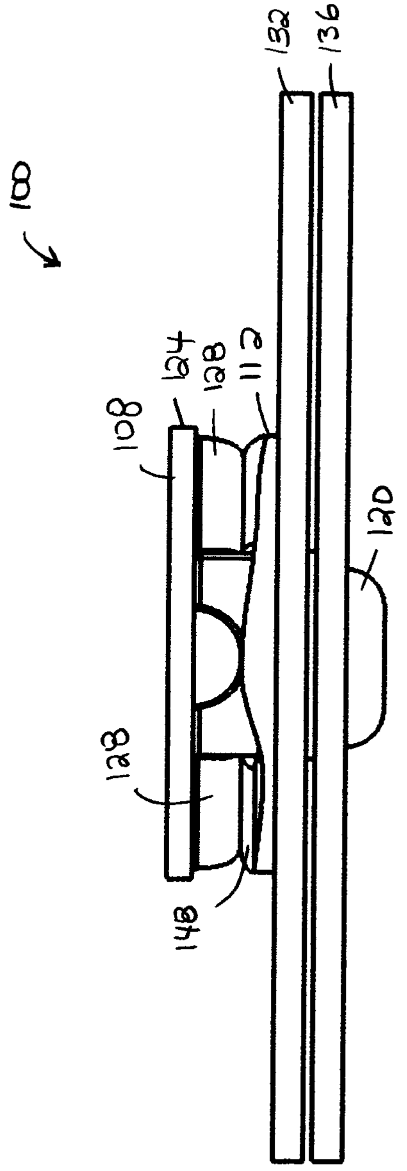
FIG. 36 is a partial side elevation view of the hinge of FIG. 34A, in a second position.

As shown in FIGS. 35-36, check plate 112 may exhibit greater axial compression when bearings 128 are positioned at higher-elevation locations on bearing engagement surface 148, and lesser axial compression when bearings 128 are positioned at lower-elevation locations on bearing engagement surface 148.

Figure 37:
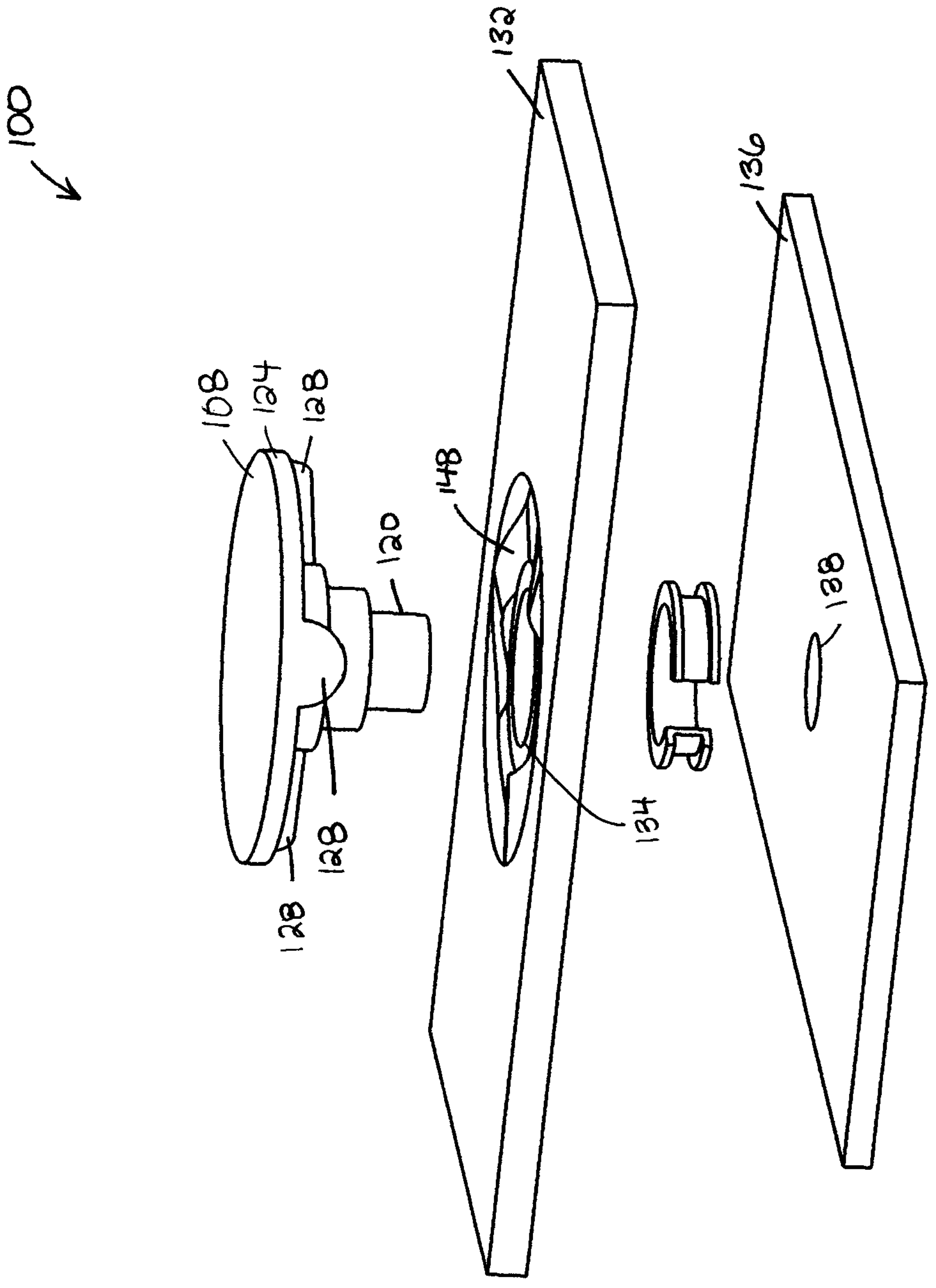
FIG. 37 is a partial exploded view of a hinge in accordance with another embodiment.

Referring to FIG. 37, in some embodiments hinge 100 may not include a discrete check plate 112. Instead, a bearing engagement surface 148 with an elevation profile of variable elevation may be integrally formed (e.g. stamped, machined, or molded) into hinge bracket layer 132. An advantage of this design is that it may omit the resiliently compressible bias and check plate, which may reduce the unit cost and size of hinge 100. In this embodiment, bearings 128 and/or hinge bracket layers 132, 136 may compress or deflect in response to interactions between bearings 128 and bearing engagement surface 148 in place of compressing the resiliently compressible member shown and described herein in connection with other embodiments.

Figure 39:
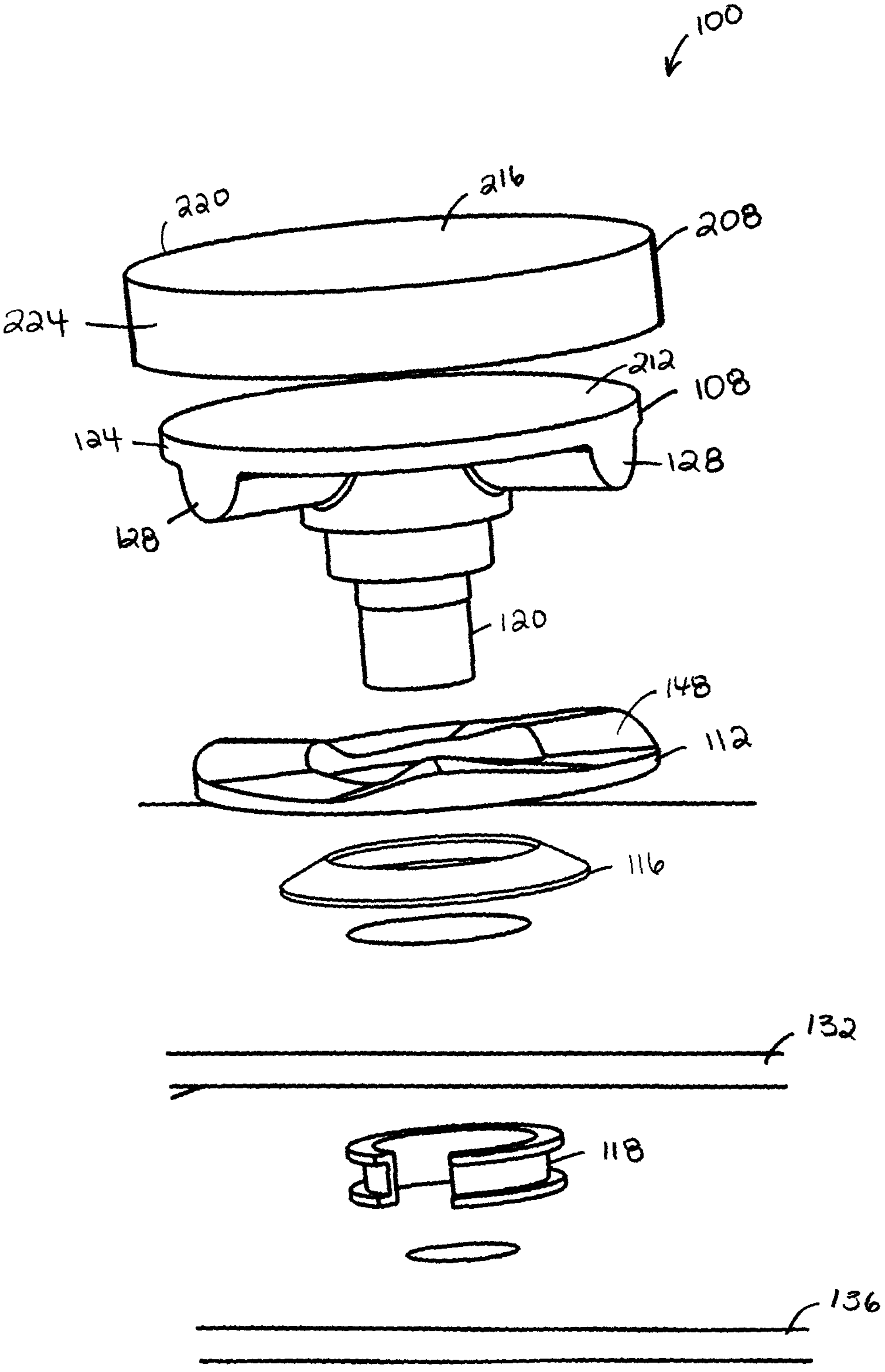
FIG. 39 is a partial exploded view of a hinge in accordance with another embodiment.
Figure 40:
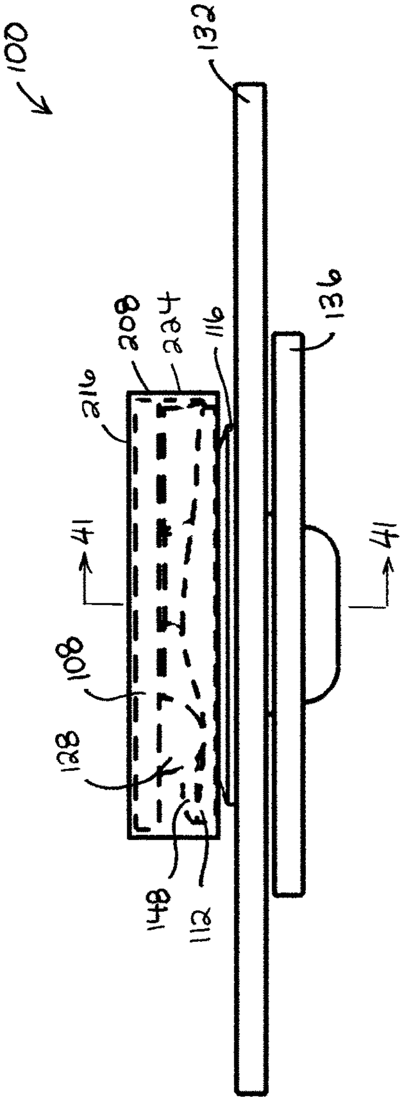
FIG. 40 is a partial side elevation view of the hinge of FIG. 39.
Figure 41:
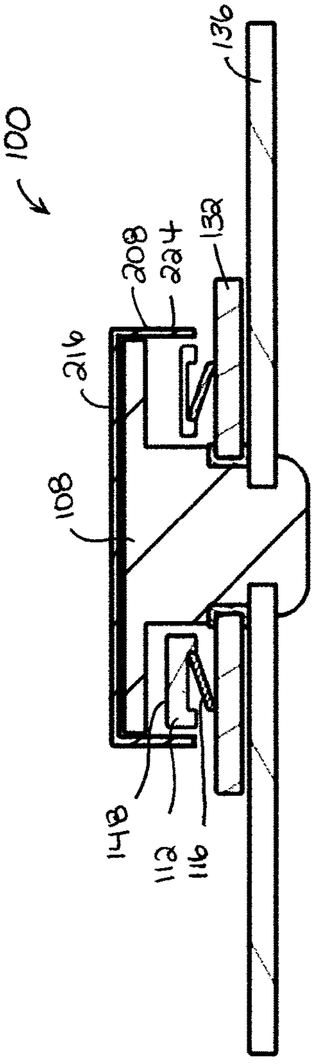
FIG. 41 is a cross-sectional view taken along line 41-41 in FIG. 40.

Reference is now made to FIGS. 39-41. Any embodiment disclosed herein may further include a protective cover 208. Protective cover 208 may help prevent dust, dirt, debris, or paint (e.g. paint applied during a factory painting step in the manufacturing of hinge 100 or in the manufacturing of the assembly to which hinge 100 is attached (e.g. a vehicle)) from fouling hinge 100. For example, protective cover 208 may help prevent such dust, dirt, debris, or paint from depositing on bearings 128 and/or bearing engagement surface 148. Such deposits might otherwise impair the performance of hinge 100. For example, deposits on bearings 128 and/or bearing engagement surface 148 may impede bearings 128 from smoothly sliding or rolling over bearing engagement surface 148.

As shown, protective cover 208 may overlie at least a portion of hinge pin 108. In the illustrated example, protective cover 208 covers hinge pin outer end 212, hinge pin bearing mount 124, and hinge pin bearings 128. In some embodiments, protective cover 208 may further cover at least a portion of check plate 112.

Protective cover 208 may have any shape and size suitable to mitigate dust, dirt, debris, and/or paint from depositing on bearings 128 and/or bearing engagement surface 148. For example, protective cover 208 may include a transversely extending end wall 216 having an end wall perimeter 220, and an axially extending sidewall 224 extending axially away from end wall 216. Sidewall 224 may surround at least a portion of hinge pin 108. For example, sidewall 224 may surround hinge pin bearing mount 124 and hinge pin bearings 128. In some embodiments, sidewall 224 may further surround at least a portion of check plate 112. As shown, protective cover 208 may have a circular cross-sectional shape, although other shapes are also feasible.

Protective cover 208 may be made of any material suitable to mitigate dust, dirt, debris, and/or paint from depositing on bearings 128 and/or bearing engagement surface 148, and that is suitable for the environment (e.g. ambient temperature) in which hinge 100 will operate. In some embodiments, protective cover 208 may be made of rubber, metal, or plastic. Where hinge 100 is applied to a vehicle, protective cover 208 may be made of rubber, metal, or high temperature plastic so that it can withstand the high temperatures of the factory paint application process.

Protective cover 208 may be permanently or removably connected to hinge pin 108 in any suitable manner. For example, protective cover 208 may be connected to hinge pin 108 by adhesive, a fastener (e.g. screw or bolt), or a friction-fit (also referred to as a press-fit).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

ITEMS

Item 1: A vehicle door hinge with integrated door check, the vehicle door hinge comprising:

a vehicle body bracket securable to a vehicle body;

a vehicle door bracket securable to a vehicle door;

a hinge pin defining an axially extending hinge rotation axis, the hinge pin providing a rotational connection between the vehicle body bracket and the vehicle door bracket that allows the vehicle door bracket to rotate about the hinge rotation axis relative to the vehicle body bracket between a door closed position and one or more door retention positions, the hinge pin comprising one or more bearings;

a door check plate having a bearing engagement surface that is (i) axially opposed to the bearings, (ii) in contact with the bearings, and (iii) surrounding the hinge rotation axis, the bearing engagement surface defining one or more semi-circular paths, each of the bearings travelling along one of the semi-circular paths as the vehicle door bracket rotates from the door closed position to the one or more door retention positions, each semi-circular path having a first end corresponding to the door closed position, and an elevation profile with a variable elevation that includes one or more retention portions, each retention portion corresponding to one of the door retention positions, and a resiliently compressible bias positioned to axially bias the bearing engagement surface against the bearings.

Item 2: The vehicle door hinge of any preceding claim, wherein:

the elevation profile of each semi-circular path includes one or more upwardly sloped portions where the elevation profile slopes upwardly towards the first end.

Item 3: The vehicle door hinge of any preceding claim, wherein:

the elevation profile of each semi-circular path includes one or more downwardly sloped portions where the elevation profile slopes downwardly towards the first end.

Item 4: The vehicle door hinge of any preceding claim, wherein:

the elevation profile of each semi-circular path includes one or more upwardly sloped portions where the elevation profile slopes upwardly towards the first end, the elevation profile of each semi-circular path includes one or more downwardly sloped portions where the elevation profile slopes downwardly towards the first end, and each retention portion is defined between a low-elevation end of an upwardly sloped portion and a low-elevation end of a downwardly sloped portion.

Item 5: The vehicle door hinge of any preceding claim, wherein:

when the bearings are located on an upwardly sloped portion of their respective semi-circular path, the hinge pin is urged to rotate relative to the door check plate away from the door closed position, and when the bearings are located on a downwardly sloped portion of their respective semi-circular path, the hinge pin is urged to rotate relative to the door check plate toward the door closed position.

Item 6: The vehicle door hinge of any preceding claim, wherein:

the bearings comprise cylindrical sliding elements.

Item 7: The vehicle door hinge of any preceding claim, wherein:

the bearings comprise spherical sliding elements.

Item 8: The vehicle door hinge of any preceding claim, wherein:

the bearing engagement surface comprises a transversely concave track aligned with the bearings.

Item 9: The vehicle door hinge of any preceding claim, wherein:

the hinge pin rotates synchronously with one of the vehicle body bracket and the vehicle door bracket, and the door check plate rotates synchronously with the other of the vehicle body bracket and the vehicle door bracket.

Item 10: A vehicle door hinge with integrated door check, the vehicle door hinge comprising:

a vehicle body bracket securable to a vehicle body;

a vehicle door bracket securable to a vehicle door;

a hinge pin defining an axially extending hinge rotation axis, the hinge pin providing a rotational connection between the vehicle body bracket and the vehicle door bracket that allows the vehicle door bracket to rotate about the hinge rotation axis relative to the vehicle body bracket between a door closed position and one or more door retention positions, the hinge pin comprising one or more bearings;

a door check plate having a bearing engagement surface that is (i) axially opposed to the bearings, (ii) in contact with the bearings, and (iii) surrounding the hinge rotation axis, the bearing engagement surface defining one or more semi-circular paths, each of the bearings travelling along one of the semi-circular paths as the vehicle door bracket rotates from the door closed position to the one or more door retention positions, each semi-circular path having a first end corresponding to the door closed position, and an elevation profile with a variable elevation that includes one or more retention portions, each retention portion corresponding to one of the door retention position, and wherein the door check plate is axially resiliently compressible and axially biases the bearing engagement surface against the bearings.

Item 11: The vehicle door hinge of any preceding item, wherein:

the elevation profile of each semi-circular path includes one or more upwardly sloped portions where the elevation profile slopes upwardly towards the first end.

Item 12: The vehicle door hinge of any preceding item, wherein:

the elevation profile of each semi-circular path includes one or more downwardly sloped portions where the elevation profile slopes downwardly towards the first end.

Item 13: The vehicle door hinge of any preceding item, wherein:

the elevation profile of each semi-circular path includes one or more upwardly sloped portions where the elevation profile slopes upwardly towards the first end, the elevation profile of each semi-circular path includes one or more downwardly sloped portions where the elevation profile slopes downwardly towards the first end, and each retention portion is defined between a low-elevation end of an upwardly sloped portion and a low-elevation end of a downwardly sloped portion.

Item 14: The vehicle door hinge of any preceding item, wherein:

when the bearings are located on an upwardly sloped portion of their respective semi-circular path, the hinge pin is urged to rotate relative to the door check plate away from the door closed position, and when the bearings are located on a downwardly sloped portion of their respective semi-circular path, the hinge pin is urged to rotate relative to the door check plate toward the door closed position.

Item 15: A vehicle door hinge with integrated door check, the vehicle door hinge comprising:

a vehicle body bracket securable to a vehicle body;

a vehicle door bracket securable to a vehicle door;

a hinge pin defining an axially extending hinge rotation axis, the hinge pin providing a rotational connection between the vehicle body bracket and the vehicle door bracket that allows the vehicle door bracket to rotate about the hinge rotation axis relative to the vehicle body bracket between a door closed position and one or more door retention positions, the hinge pin comprising one or more bearings;

a bearing engagement surface integrally formed into one of the vehicle body bracket and the vehicle door bracket, the bearing engagement surface being (i) axially opposed to the bearings, (ii) in contact with the bearings, and (iii) surrounding the hinge rotation axis, the bearing engagement surface defining one or more semi-circular paths, each of the bearings travelling along one of the semi-circular paths as the vehicle door bracket rotates from the door closed position to the one or more door retention positions, each semi-circular path having a first end corresponding to the door closed position, and an elevation profile with a variable elevation that includes one or more retention portions, each retention portion corresponding to one of the door retention position.

Item 16: The vehicle door hinge of any preceding item, wherein:

the elevation profile of each semi-circular path includes one or more upwardly sloped portions where the elevation profile slopes upwardly towards the first end, the elevation profile of each semi-circular path includes one or more downwardly sloped portions where the elevation profile slopes downwardly towards the first end, and each retention portion is defined between a low-elevation end of an upwardly sloped portion and a low-elevation end of a downwardly sloped portion.

Item 17: The vehicle door hinge of any preceding item, wherein:

when the bearings are located on an upwardly sloped portion of their respective semi-circular path, the hinge pin is urged to rotate relative to the door check plate away from the door closed position, and when the bearings are located on a downwardly sloped portion of their respective semi-circular path, the hinge pin is urged to rotate relative to the door check plate toward the door closed position.

Item 18: The vehicle door hinge of any preceding item, wherein:

the bearings comprise cylindrical sliding elements.

Item 19: The vehicle door hinge of any preceding item, wherein:

the bearings comprise spherical sliding elements.

Item 20: The vehicle door hinge of any preceding item, wherein:

the bearing engagement surface comprises a transversely concave track aligned with the bearings.

The invention claimed is:

1. A vehicle door hinge with integrated door check, the vehicle door hinge comprising:

a vehicle body bracket securable to a vehicle body;

a vehicle door bracket securable to a vehicle door;

a hinge pin defining an axially extending hinge rotation axis, the hinge pin providing a rotational connection between the vehicle body bracket and the vehicle door bracket that allows the vehicle door bracket to rotate about the hinge rotation axis relative to the vehicle body bracket between a door closed position and one or more door retention positions, the hinge pin comprising three or more bearings;

a door check plate having a bearing engagement surface that is (i) axially opposed to the three or more bearings, (ii) in contact with the three or more bearings, and (iii) surrounding the hinge rotation axis, the bearing engagement surface defining three or more curved paths, wherein a number of curved paths is equal to a number of bearings, each curved path having a respective first end, a respective second end, and an elevation profile between the first and second ends, the elevation profile having one or more upwardly sloped portions, one or more downwardly sloped portions, and one or more retention portions, the elevation profile of each curved path being substantially identical, the first end of each curved path corresponding to the door closed position, each retention portion of each curved path corresponding to one of the one or more door retention positions, and each of the three or more bearings travelling along a respective one of the curved paths from the first end toward the one or more retention portions when the vehicle door bracket rotates from the door closed position toward the one or more door retention positions, and a resiliently compressible bias positioned in contact with the door check plate, the door check plate being axially displaceable and the resiliently compressible bias axially biasing the door check plate toward the three or more bearings to maintain contact between the bearing engagement surface and the three or more bearings as each bearing travels along the elevation profile of their respective curved path.

2. The vehicle door hinge of claim 1, wherein:

when the three or more bearings are located on an upwardly sloped portion of their respective curved path, the hinge pin is urged to rotate relative to the door check plate away from the door closed position, and when the three or more bearings are located on a downwardly sloped portion of their respective curved path, the hinge pin is urged to rotate relative to the door check plate toward the door closed position.

3. The vehicle door hinge of claim 1, wherein:

the three or more bearings comprise cylindrical sliding elements.

4. The vehicle door hinge of claim 1, wherein:

the three or more bearings comprise spherical sliding elements.

5. The vehicle door hinge of claim 4, wherein:

the bearing engagement surface comprises a transversely concave track aligned with the three or more bearings.

6. The vehicle door hinge of claim 1, wherein:

the hinge pin rotates synchronously with one of the vehicle body bracket and the vehicle door bracket, and the door check plate rotates synchronously with the other of the vehicle body bracket and the vehicle door bracket.

7. A vehicle door hinge with integrated door check, the vehicle door hinge comprising:

a vehicle body bracket securable to a vehicle body;

a vehicle door bracket securable to a vehicle door;

a hinge pin defining an axially extending hinge rotation axis, the hinge pin providing a rotational connection between the vehicle body bracket and the vehicle door bracket that allows the vehicle door bracket to rotate about the hinge rotation axis relative to the vehicle body bracket between a door closed position and one or more door retention positions, the hinge pin comprising three or more bearings;

a door check plate having a bearing engagement surface that is (i) axially opposed to the three or more bearings, (ii) in contact with the three or more bearings, and (iii) surrounding the hinge rotation axis, the bearing engagement surface defining three or more curved paths, wherein a number of curved paths is equal to a number of bearings, each curved path having a respective first end, a respective second end, and an elevation profile between the first and second ends, the elevation profile having a variable elevation that includes one or more retention portions, the elevation profile of each curved path being substantially identical, the first end of each curved path corresponding to the door closed, each retention portion of each curved path corresponding to one of the one or more door retention positions, and each of the three or more bearings travelling along a respective one of the curved paths from the first end toward the one or more retention portions when the vehicle door bracket rotates from the door closed position toward the one or more door retention positions, and wherein at least a portion of the door check plate comprises an axially resiliently compressible material that axially biases the bearing engagement surface against the three or more bearings as each bearing travels along the elevation profile of their respective curved path.

8. The vehicle door hinge of claim 7, wherein:

the elevation profile of each curved path includes one or more upwardly sloped portions where the elevation profile slopes upwardly towards the first end.

9. The vehicle door hinge of claim 7, wherein:

the elevation profile of each curved path includes one or more downwardly sloped portions where the elevation profile slopes downwardly towards the first end.

10. The vehicle door hinge of claim 7, wherein:

the elevation profile of each curved path includes one or more upwardly sloped portions where the elevation profile slopes upwardly towards the first end, the elevation profile of each curved path includes one or more downwardly sloped portions where the elevation profile slopes downwardly towards the first end, and each retention portion is defined between a low-elevation end of an upwardly sloped portion and a low-elevation end of a downwardly sloped portion.

11. The vehicle door hinge of claim 7, wherein:

when the three or more bearings are located on an upwardly sloped portion of their respective curved path, the hinge pin is urged to rotate relative to the door check plate away from the door closed position, and when the three or more bearings are located on a downwardly sloped portion of their respective curved path, the hinge pin is urged to rotate relative to the door check plate toward the door closed position.

12. A vehicle door hinge with integrated door check, the vehicle door hinge comprising:

a vehicle body bracket securable to a vehicle body;

a vehicle door bracket securable to a vehicle door;

a hinge pin defining an axially extending hinge rotation axis, the hinge pin providing a rotational connection between the vehicle body bracket and the vehicle door bracket that allows the vehicle door bracket to rotate about the hinge rotation axis relative to the vehicle body bracket between a door closed position and one or more door retention positions, the hinge pin comprising three or more rigidly coupled bearings;

a bearing engagement surface integrally formed into one of the vehicle body bracket and the vehicle door bracket, the bearing engagement surface being (i) axially opposed to the three or more bearings, (ii) in contact with the three or more bearings, and (iii) surrounding the hinge rotation axis, the bearing engagement surface defining three or more curved paths, wherein a number of curved paths is equal to a number of bearings, each curved path having a respective first end corresponding to the door closed position, a respective second end, and an elevation profile between the first and second ends, the elevation profile having a variable elevation that includes one or more retention portions, each retention portion of each curved path corresponding to one of the one or more door retention positions, the elevation profile of each curved path being substantially identical, and each of the bearings travelling along a respective one of the curved paths from the first end toward the one or more retention portions when the vehicle door bracket rotates from the door closed position toward the one or more door retention positions.

13. The vehicle door hinge of claim 12, wherein:

the elevation profile of each curved path includes one or more upwardly sloped portions where the elevation profile slopes upwardly towards the first end, the elevation profile of each curved path includes one or more downwardly sloped portions where the elevation profile slopes downwardly towards the first end, and each retention portion is defined between a low-elevation end of an upwardly sloped portion and a low-elevation end of a downwardly sloped portion.

14. The vehicle door hinge of claim 12, wherein:

when the bearings are located on an upwardly sloped portion of their respective curved path, the hinge pin is urged to rotate relative to the door check plate away from the door closed position, and when the bearings are located on a downwardly sloped portion of their respective curved path, the hinge pin is urged to rotate relative to the door check plate toward the door closed position.

15. The vehicle door hinge of claim 12, wherein:

the three or more bearings comprise cylindrical sliding elements.

16. The vehicle door hinge of claim 12, wherein:

the three or more bearings comprise spherical sliding elements.

17. The vehicle door hinge of claim 16, wherein:

the bearing engagement surface comprises a transversely concave track aligned with the three or more bearings.

18. The vehicle door hinge of claim 1, wherein the one or more retention portions comprise two retention portions and a thickness of the door check plate at a first retention portion of the two retention portions is greater than the thickness of the door check plate at a second retention portion of the two retention portions.

19. The vehicle door hinge of claim 5, wherein the transversely concave track extends along the entire bearing engagement surface.

20. The vehicle door hinge of claim 1, wherein the one or more upwardly sloped portions and the one or more downwardly sloped portions collectively form at least 70% of each curved path.

* * * * *